US008973299B2

(12) United States Patent
Durand

(10) Patent No.: US 8,973,299 B2
(45) Date of Patent: Mar. 10, 2015

(54) FLYING INSECT TRAPPING DEVICE AND FLYING INSECT TRAPPING SYSTEM

(75) Inventor: Emma Amelia Durand, Jamestown, RI (US)

(73) Assignee: Woodstream Corporation, Lititz, PA (US)

( * ) Notice: Subject to any disclaimer, the term of this patent is extended or adjusted under 35 U.S.C. 154(b) by 785 days.

(21) Appl. No.: 11/921,182

(22) PCT Filed: Jun. 14, 2007

(86) PCT No.: PCT/US2007/013867
§ 371 (c)(1),
(2), (4) Date: Nov. 2, 2009

(87) PCT Pub. No.: WO2007/146332
PCT Pub. Date: Dec. 21, 2007

(65) Prior Publication Data
US 2010/0037512 A1     Feb. 18, 2010

Related U.S. Application Data

(60) Provisional application No. 60/813,695, filed on Jun. 15, 2006.

(51) Int. Cl.
*A01M 1/02*     (2006.01)
*A01M 1/06*     (2006.01)
(52) U.S. Cl.
CPC *A01M 1/06* (2013.01); *A01M 1/023* (2013.01)
USPC .......................................... 43/139; 43/132.1
(58) Field of Classification Search
USPC .......... 43/124–125, 129, 132.1, 138–139, 144
See application file for complete search history.

(56) References Cited

U.S. PATENT DOCUMENTS

| 5,027,547 | A | * | 7/1991 | Livshin ........................... 43/124 |
| 5,123,201 | A | * | 6/1992 | Reiter ............................ 43/107 |
| 5,669,176 | A | | 9/1997 | Miller |
| 5,813,166 | A | | 9/1998 | Wigton et al. |
| 5,915,949 | A | * | 6/1999 | Johnson ........................... 43/124 |
| 6,145,243 | A | | 11/2000 | Wigton et al. |
| 6,286,249 | B1 | | 9/2001 | Miller et al. |
| 6,564,503 | B1 | * | 5/2003 | Miyahara et al. ............... 43/112 |
| 6,840,005 | B2 | | 1/2005 | Durand et al. |
| 6,892,492 | B2 | | 5/2005 | Durand et al. |
| 7,074,830 | B2 | * | 7/2006 | Durand et al. ................. 514/557 |
| 7,293,388 | B2 | * | 11/2007 | DeYoreo et al. ............... 43/139 |
| 7,320,439 | B2 | * | 1/2008 | Davis et al. ................... 239/329 |
| 2003/0084604 | A1 | | 5/2003 | Durand et al. |
| 2003/0218543 | A1 | * | 11/2003 | Gardner et al. ............ 340/573.2 |

(Continued)

FOREIGN PATENT DOCUMENTS

| WO | WO 97/10709 | 3/1997 |
| WO | WO 2005/082139 | 9/2006 |

*Primary Examiner* — David Parsley
(74) *Attorney, Agent, or Firm* — Jacobson Holman, PLLC

(57) ABSTRACT

A device for trapping flying insects and a system of such devices are disclosed. The device includes a supporting frame with an associated combustible fuel supply connected to a combustion device with a fan which is operated to generate an exhaust gas having carbon dioxide to attract flying insects. The insects are drawn into a trap chamber on the frame by suction where they are collected and/or killed. The device may further include various sensors to regulate fuel flow and fan speed in accordance with insect activity as influenced by environmental and other factors.

23 Claims, 21 Drawing Sheets

(56) References Cited

U.S. PATENT DOCUMENTS

| | | |
|---|---|---|
| 2004/0001870 A1 | 1/2004 | Durand et al. |
| 2004/0139648 A1 | 7/2004 | Durand et al. |
| 2004/0237381 A1 | 12/2004 | Durand et al. |
| 2004/0237382 A1 | 12/2004 | Durand et al. |
| 2004/0244276 A1 | 12/2004 | Durand et al. |
| 2005/0019361 A1 | 1/2005 | Durand et al. |
| 2005/0066570 A1 * | 3/2005 | Mosher et al. ............ 43/139 |
| 2005/0210737 A1 | 9/2005 | Durand et al. |
| 2005/0268529 A1 | 12/2005 | Durand et al. |
| 2006/0006197 A1 | 1/2006 | Davis |
| 2006/0086823 A1 | 4/2006 | Colarusso |
| 2007/0084105 A1 * | 4/2007 | Lindsay et al. ............ 43/129 |

\* cited by examiner

FLYING INSECT TRAPPING DEVICE AND FLYING INSECT TRAPPING SYSTEM

RELATED APPLICATION

This application is a national stage of PCT/US2007/013867, filed Jun. 14, 2007, and published in English, which claims the priority of U.S. Provisional Application Ser. No. 60/813,695, filed Jun. 15, 2006.

BACKGROUND OF THE INVENTION

1. Field of the Invention

The present invention relates to a device for trapping flying insects, such as mosquitoes, no-see-ums, and other insects, and a system that includes a plurality of such devices.

2. Description of Related Art

Mosquitoes, as well as other biting insects, have proven not only to be a nuisance, but have also proven to be carriers of diseases, including but not limited to the West Nile virus, dengue fever, and malaria. Flying insect trapping devices have been developed to successfully attract and capture mosquitoes, sandflies, etc. Examples of such devices may be found in U.S. Pat. Nos. 5,669,176, 5,813,166, 6,145,243, 6,286,249, 6,840,005, and 6,892,492, and United States Patent Application Publication Nos. 2003/0084604, 2004/0001870, 2004/0139648, 2004/0237381, 2004/0237382, 2004/0244276, 2005/0019361, 2005/0210737, and 2005/0268529. Although the insect trapping devices disclosed in these patents and published patent applications have been effective in trapping flying insects, improvements over these devices are continuously sought after.

BRIEF SUMMARY OF THE INVENTION

It is an aspect of the present invention to provide a flying insect trapping device for trapping different flying insects more efficiently and effectively than existing devices.

In an embodiment of the invention, a flying insect trapping device that is configured to be used with a fuel supply containing combustible fuel is provided. The device includes a supporting frame, an insect trap chamber, and a combustion device comprising an inlet port for connection with the fuel supply, an exhaust port, and a combustion chamber communicating the inlet port with the exhaust port. The inlet port enables the fuel from the fuel supply to flow into the combustion chamber for continuous combustion therein to create an exhaust gas comprising carbon dioxide within the combustion chamber. The device also includes an adjustable fuel regulator for controlling fuel flow to the inlet port of the combustion device, a fan for controlling air flow to the combustion device, and an exhaust outlet communicated with the exhaust port of the combustion device. The exhaust outlet is configured to allow the exhaust gas to flow outwardly through the exhaust outlet so that insects attracted to the carbon dioxide in the exhaust gas will fly towards the device. The device also includes an insect inlet communicated with the insect trap chamber to enable flying insects to enter the trap chamber through the insect inlet, and a photosensor on an exterior of the device for detecting ambient light. The photosensor is communicated to the fuel regulator and the fan. The fuel regulator is configured to reduce the flow of the fuel to a non-zero level and the fan is configured to reduce the flow of the air to a non-zero level when the photosensor detects the ambient light is above a predetermined threshold value.

In another embodiment of the invention, the device includes one or more sensors for sensing at least one parameter selected from the group consisting of (a) a temperature of ambient air surrounding the device, (b) a temperature of the exhaust gas, (c) an amount of carbon dioxide in the exhaust gas, (d) an amount of carbon monoxide in the exhaust gas, and (e) an amount of oxygen in the exhaust gas, and a controller communicated to the one or more sensors. The controller is operable to perform an operation to adjust the temperature of the exhaust gas based on the at least one parameter sensed by the one or more sensors.

In another embodiment of the invention, the device includes a sensor for sensing a chemical property of the exhaust gas. The chemical property is selected from the group consisting of carbon dioxide, carbon monoxide, and oxygen. The device also includes a controller configured to adjust at least one operating parameter of the device based on the sensed chemical properly.

In another embodiment of the invention, a flying insect trapping device is provided. The device includes a supporting frame, an insect trap chamber, an insect attractant for attracting insects towards the device, an insect inlet communicated with the insect trap chamber to enable flying insects to enter the trap chamber through the insect inlet, and a vacuum device communicated to the insect inlet. The vacuum device is constructed and arranged to draw insects attracted to the insect attractant through the insect inlet and into the insect trap chamber. The trapping device also includes a sensor for monitoring an accumulation of the insects in the insect trap chamber.

In another embodiment of the invention, there is provided a flying insect trapping device that includes a supporting frame, an insect trap chamber, an insect attractant for attracting insects towards the device, an insect inlet communicated with the insect trap chamber to enable flying insects to enter the trap chamber through the insect inlet, and a vacuum device communicated to the insect inlet. The vacuum device is constructed and arranged to draw insects attracted to the device through the insect inlet and into the insect trap chamber. The device also includes a sensor for sensing an amount of attractant in the device.

In another embodiment, the device includes a timer that is configured to monitor an amount of time the attractant has been mounted to the device.

In another embodiment of the invention, there is provided a flying insect trapping device that includes a supporting frame, an insect trap chamber, an insect attractant for attracting insects towards the device, an insect inlet communicated with the insect trap chamber to enable flying insects to enter the trap chamber through the insect inlet, and a vacuum device communicated to the insect inlet. The vacuum device is constructed and arranged to draw insects attracted to the device through the insect inlet and into the insect trap chamber. The trapping device also includes a monitoring chamber comprising a imaging device. The monitoring chamber is communicated between the insect inlet and the insect trap chamber. The imaging device is configured to capture images of flying insects that have entered the insect inlet.

In another embodiment of the invention, a method for evaluating performance of a plurality of insect trapping devices is provided. The method includes receiving electronic data from each of the insect trapping devices, the data being representative of an accumulation of insects in the trapping device. The method also includes comparing the electronic data from the insect trapping devices to determine relative accumulation of insects in the trapping devices, and reporting the results of said comparison.

In another embodiment of the invention, there is provided a flying insect trapping device. The device includes a supporting frame, an insect trap chamber, an insect attractant for attracting insects towards the device, an insect inlet communicated with the insect trap chamber to enable flying insects to enter the trap chamber through the insect inlet, and a vacuum device communicated to the insect inlet. The vacuum device is constructed and arranged to draw insects attracted to the insect attractant through the insect inlet and into the insect trap chamber. The trapping device also includes a controller configured to adjust at least one operating parameter of the device based on at least one weather condition at the device. The weather condition is selected from the group consisting of wind direction, wind speed, relative humidity, rainfall, and temperature.

In another embodiment of the invention, a flying insect trapping device is provided. The device includes a supporting frame, an insect trap chamber, and a plurality of insect attractants. Each insect attractant is selected for attracting different types of insects towards the device. The device also includes an insect attractant dispenser for dispensing one of the plurality of insect attractants at a time into an exhaust gas, an insect inlet communicated with the insect trap chamber to enable flying insects to enter the trap chamber through the insect inlet, and a vacuum device communicated to the insect inlet. The vacuum device is constructed and arranged to draw insects attracted to the insect attractant through the insect inlet and into the insect trap chamber. The trapping device also includes a controller communicated to the dispenser. The controller is configured to signal the dispenser to change the insect attractant based on a predetermined time.

Other objects, features, and advantages of the present invention will become apparent from the following detailed description, the accompanying drawings, and the appended claims.

DETAILED DESCRIPTION OF THE INVENTION

Figure 1:
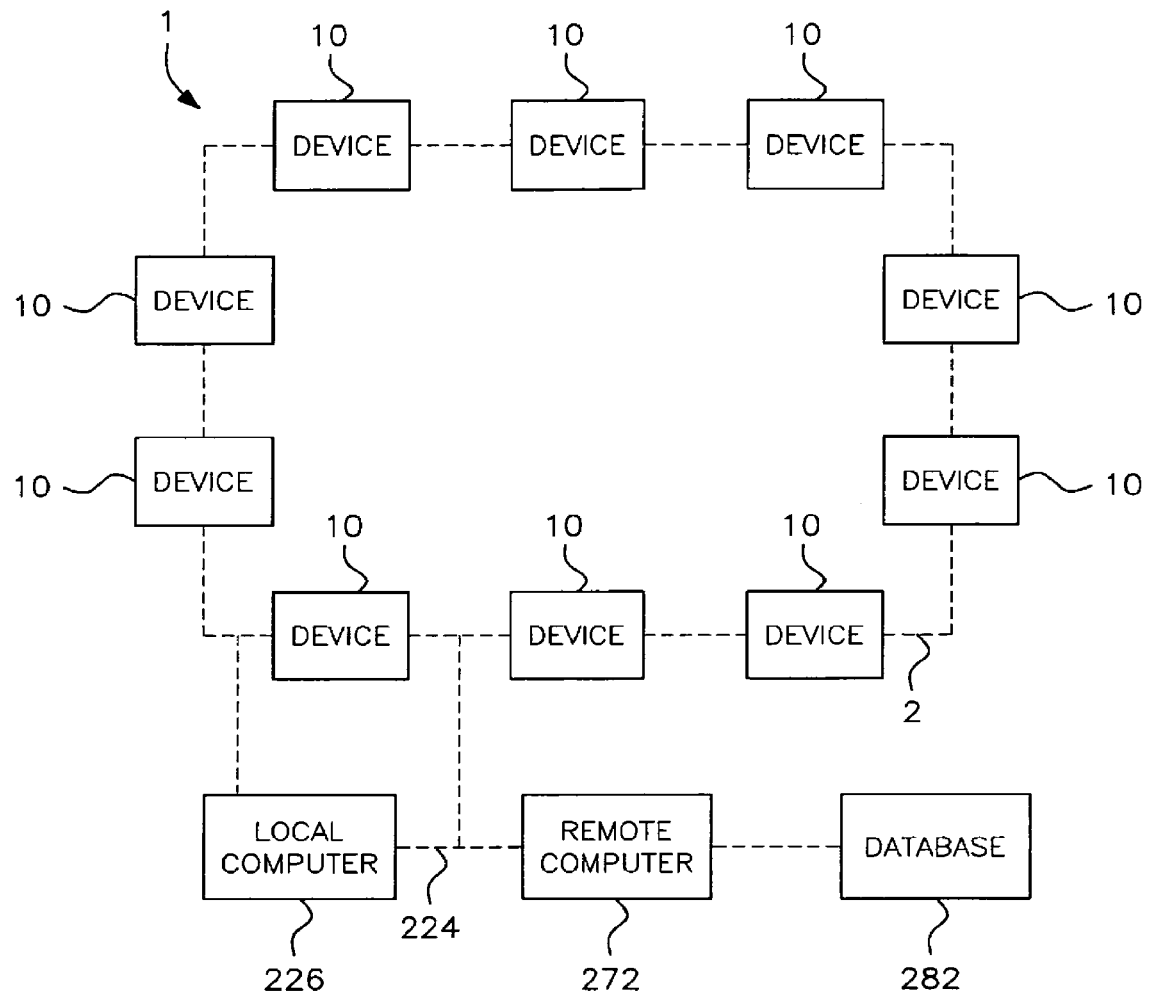
FIG. 1 is a schematic view of a system of flying insect trapping devices.

FIG. 1 is a schematic view of an embodiment of a system of flying insect trapping devices, generally indicated at 1, in accordance with the present invention. As shown in FIG. 1, a plurality of flying insect trapping devices 10 are interconnected via a common network 2. The network may be any type of network, such as a local area network, or a wide area network, such as the Internet. The system 1 will be discussed in more detail below.

Figure 2:
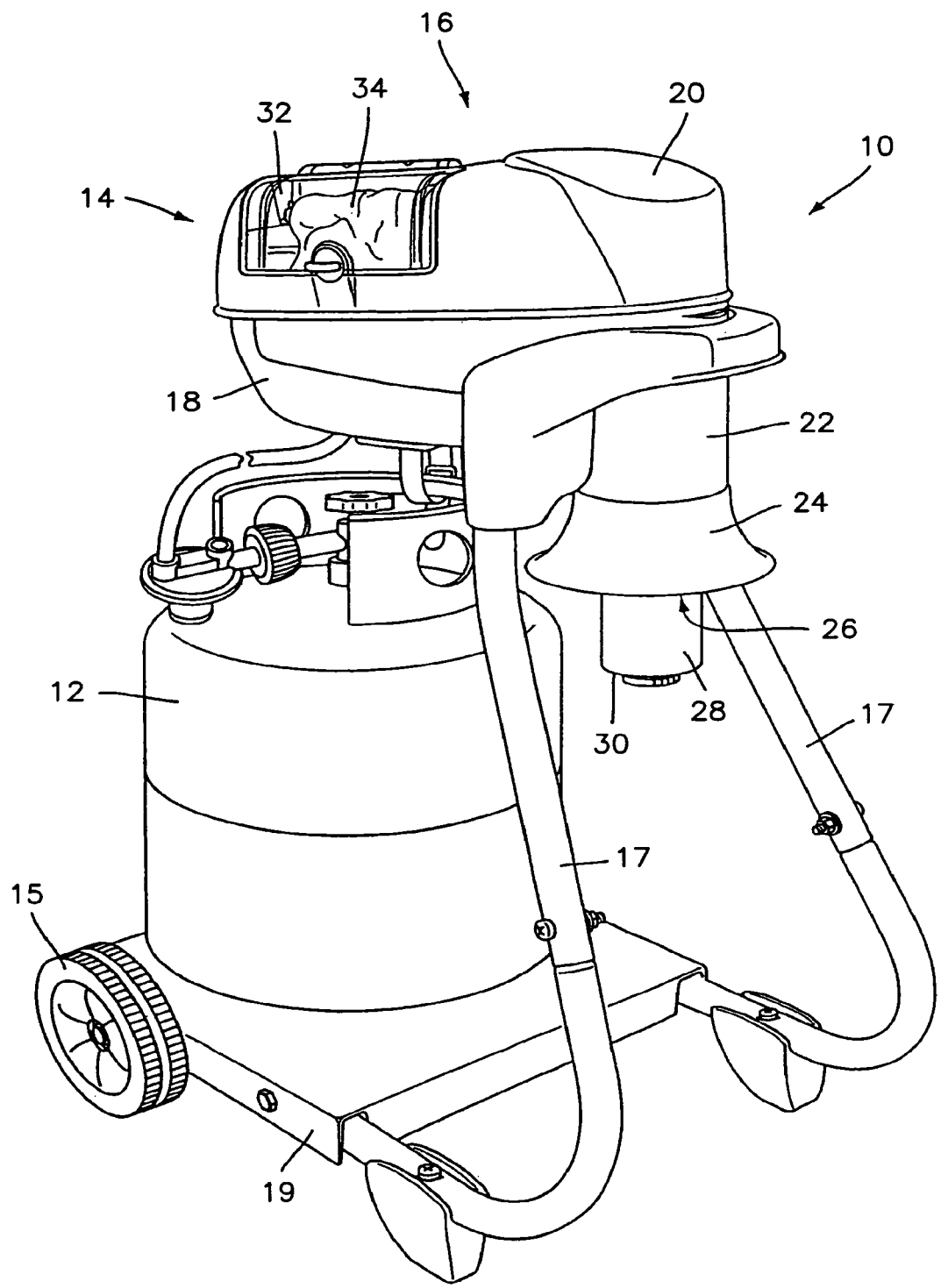
FIG. 2 is a perspective view of a device constructed in accordance with the principles of the present invention.

FIG. 2 is a perspective view of an embodiment of one of the flying insect trapping devices 10 of the system 1, constructed in accordance with the present invention. The device 10 is designed to be used with a supply of combustible fuel, such as a propane tank 12 of the type conventionally used by consumers for supplying fuel to a barbecue grill. Broadly speaking, the general function of the device 10 is to emit an exhaust gas with an increased carbon dioxide content to attract mosquitoes and other flesh biting insects that are attracted to carbon dioxide. Then, an inflow, draws the attracted insects into a trap chamber within the device, whereat the insects are captured and killed by poison or dehydration/starvation. Alternatively, a user engaged in the study of insects may opt to not kill the captured insects and instead may remove them from the device 10 prior to dying for purposes of live examination. Regardless of the specific insect capturing purpose the user has in mind, the overall function of the device 10 is to attract and capture flying insects. The specifics of how the illustrated embodiment operates to achieve this broad general function is discussed hereinbelow.

The device 10 comprises a supporting frame structure, generally indicated at 14. The supporting frame structure 14 includes a housing 16 supported on a set of legs 17. In the illustrated embodiment, two legs 17 are used to support the housing 16. The supporting frame structure 14, however, may have any construction or configuration suitable for carrying the operative components discussed herein below, for example a tripod arrangement may also be used. Additionally, the frame may include wheels 15, as shown in FIG. 2 and the aforementioned U.S. Pat. No. 6,145,243, the entirety of which is hereby incorporated into the present application by reference. Further, the supporting frame structure 14 may also include a supporting deck 19 for carrying the propane tank 12, so that the tank 12 and device 14 can be transported together as a unit, as is also shown in FIG. 2 and the '243 patent.

The housing 16 includes a bottom shell 18 and a top shell 20 mounted thereto. The shells 18 and 20 are coupled and secured together using conventional fasteners, adhesives, a snap-fit relation, or in any other suitable manner. In the illustrated embodiment, these shells 18 and 20 are molded from plastic; however, these shells 18, 20, and the housing 16 in general, may be made from any materials and may take any shape, configuration, or construction.

A tubular intake nozzle 22 protrudes downwardly from the bottom shell 18 and is formed integrally therewith. The intake nozzle 22 has a flared lower end 24 which is attached by fasteners or snap-fitting to, and thus forms a part of, the intake nozzle 22. The flared lower end 24 defines an insect inlet 26. As will be appreciated from the details provided hereinbelow, a vacuum is applied to the nozzle 22 and the insects attracted to the carbon dioxide emanated by the device 10 will be drawn into the insect inlet 26 for capture. The intake nozzle 22 and the inlet 26 provided thereby may be carried on the supporting frame structure 14 in any suitable matter and the construction illustrated and described is only an exemplary construction. Thus, other configurations may be used.

Figure 3:
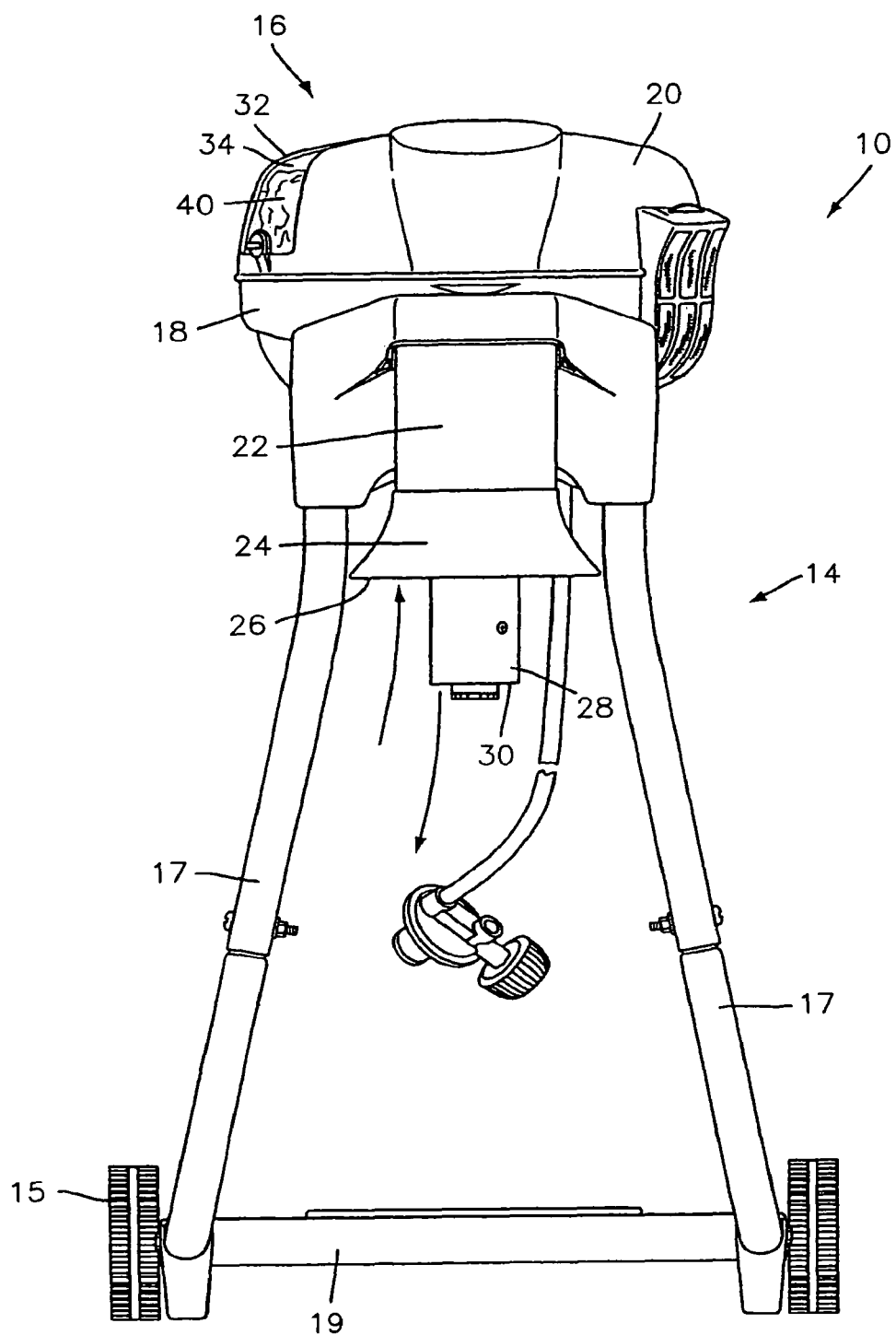
FIG. 3 is a front elevational view of the device of FIG. 2.

Concentrically mounted within the intake nozzle 22 is an outlet nozzle 28. The outlet nozzle 28 provides an exhaust outlet 30 on the lower end thereof. The function of the outlet nozzle 28 and its exhaust outlet 30 is to allow a "plume" of exhaust gas comprising carbon dioxide to flow outwardly and downwardly therefrom. As the downward flow of the exhaust gas reaches the ground, it flows radially outwardly from the device 10 along the ground. Mosquitoes and other insects attracted to carbon dioxide away from the device 10 will be able to sense this radiated plume of carbon dioxide and follow the same to its source, namely the exhaust outlet 30. As can be appreciated from the construction disclosed, because the outlet nozzle 28 is concentric with the intake nozzle 22, the attracted insects will follow the carbon dioxide to its source (i.e., the outlet 30) and thus they will be immediately adjacent the insect inlet 26 upon reaching the outlet 30. As a result, the attracted insects will fly directly into the vacuum zone created by the vacuum communicated to the intake nozzle 22 and its insect inlet 26 whereby they are drawn into the device 10 and captured therein. The respective flows of the vacuum intake and the exhaust gas outflow are indicated by the inflow and outflow arrows in FIG. 3. For further details and variations on this aspect of the disclosed construction, reference may be made to the above-incorporated '243 patent. Also, reference may be made to U.S. Pat. No. 6,286,249 filed Sep. 17, 1996, the entirety of which is hereby incorporated into the present application by reference.

Figure 4:
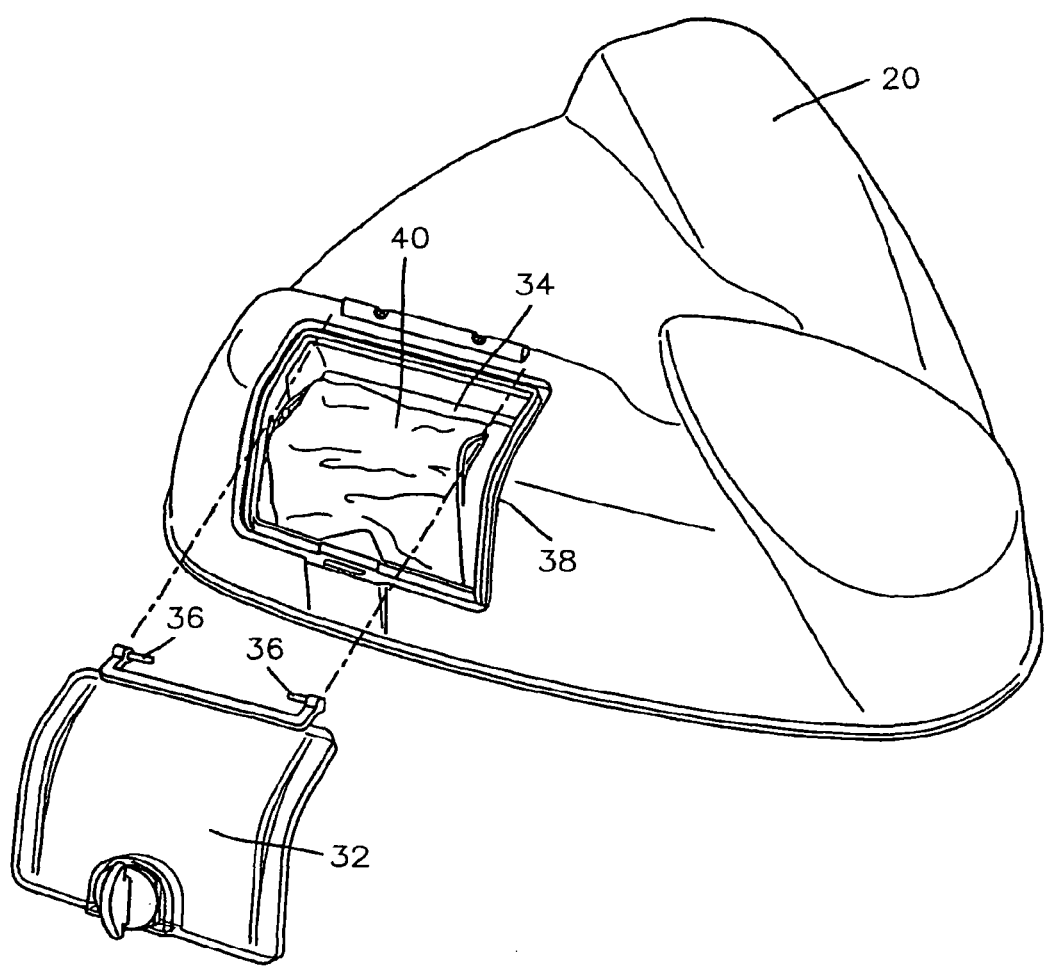
FIG. 4 is a perspective view of a top shell of the housing of the device of FIG. 2.

The upper shell 20 of the housing 16 includes an access door 32 that can be moved between open and closed positions to open and close an access opening 34 formed in the housing wall. The access door 32 and the access opening 34 opened and closed thereby is best illustrated in FIG. 4. The door 32 is pivotally mounted to the upper shell 20 to facilitate its opening and closing movements by inserting pivot pins 36 at the upper end thereof into openings (not shown) formed in the upper shell 20 adjacent the upper edge of the opening 34. In the broader aspects of the invention the door 32 may be entirely separable from the housing 16, or may be connected for opening and closing movements using any suitable construction. In fact, the provision of the door 32 is not necessary at all and is simply a feature for convenience. A deformable gasket 38 is attached along the periphery of the opening 34 to provide a seal between the door 32 and the periphery of the opening 34. The role of the access door 32 and its associated opening 34 is to enable a user to gain access to the interior of the housing 16.

As will be described in further detail below, a mesh bag 40, the interior of which defines an insect trap chamber, is removably mounted within the housing 16. The chamber defined by the bag 40 is communicated to the insect inlet 26 so that the insects drawn in by the vacuum will be deposited in the bag 40 whereat they will become dehydrated and perish. Alternatively, the material of the bag 40 may be treated with a poison for purposes of facilitating the insect termination function; however, that is not a necessary feature of the invention. The access door 32 and its associated opening 34 permit access into the interior of the housing 16 to allow the user to access the mesh bag 40 as desired for purposes of removal/replacement. Also, as another alternative, a plastic box or any other suitable structure may be used in place of mesh bag 40. In the disclosed embodiment, the door 32 is formed from a transparent material to enable to user to visually inspect the bag 40 to determine whether it needs removal/replacement. Specifically, the transparent material enables to user to visually verify whether the bag 40 is at or near its full capacity of insects. In the broader aspects of the invention, the door 32 need not be transparent, and further, as mentioned previously, the device does not necessarily require the door 32 and its associated opening 34.

Figure 5:
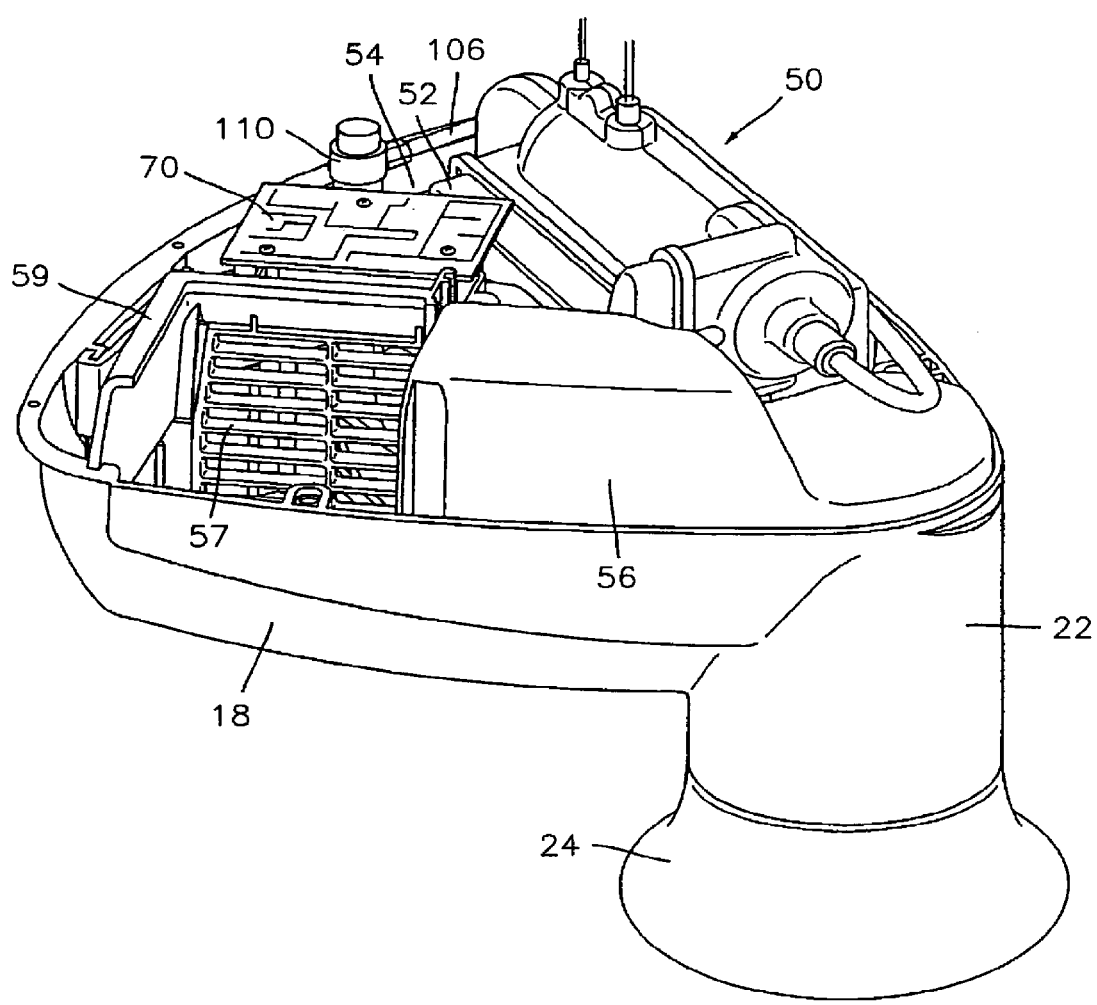
FIG. 5 is a perspective view of the housing of the device of FIG. 2 with the top shell removed.
Figure 6:
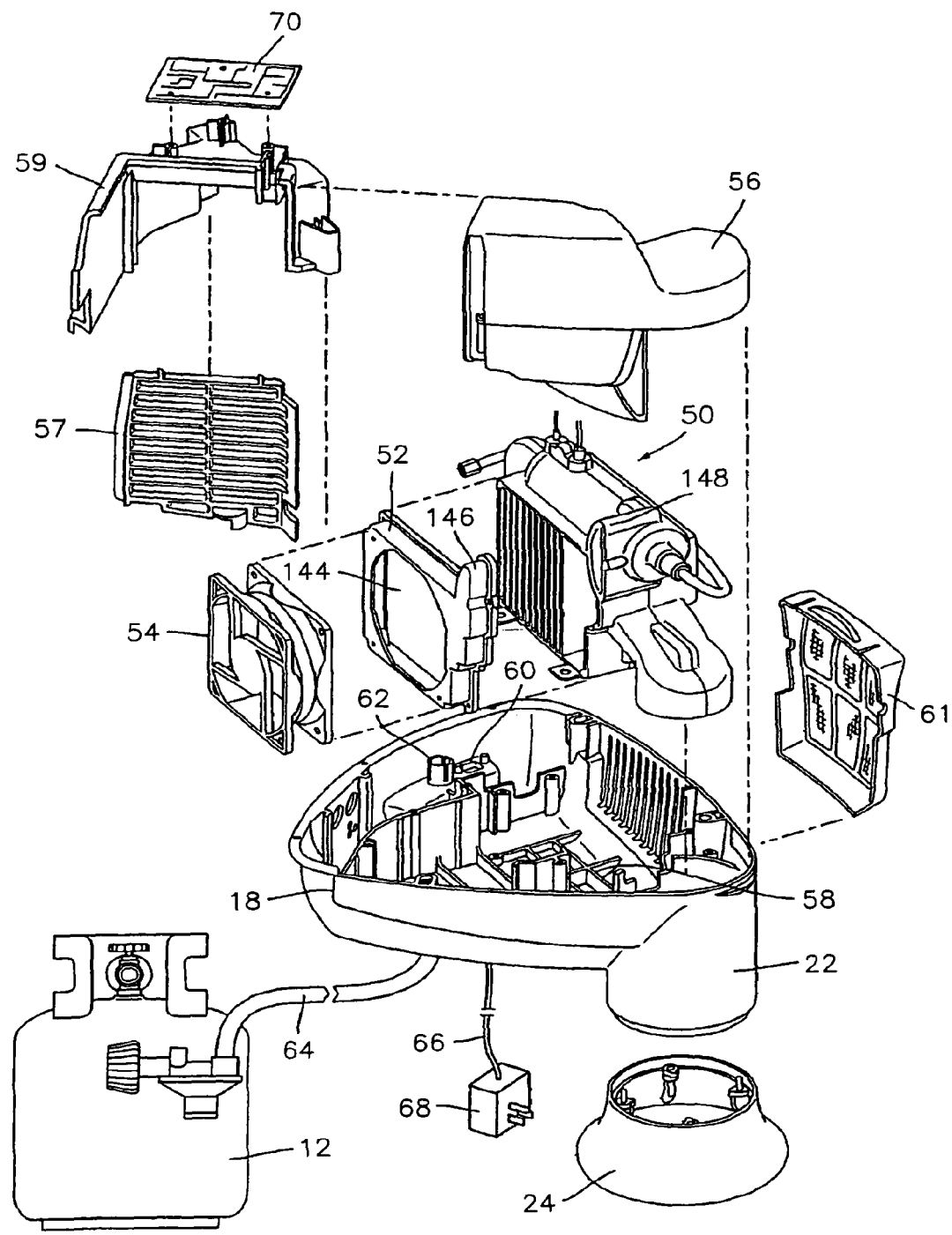
FIG. 6 is an exploded view of the components associated with the housing.

FIG. 5 shows a perspective view of the components internal to the housing 16; with the bag 40 and the upper shell 20 removed for clarity, and FIG. 6 shows an exploded view of these components. These internal components include a combustion/heat exchanger device, generally indicated at 50, a fan plenum 52, an electrically powered fan 54, and a partition structure 56. The bottom shell 18 includes a series of integrally molded ribs 58 defining a relatively flat are for mounting the combustion/beat exchanger device 50. Further, the bottom shell 18 also includes a pair of openings 60, 62. Opening 60 is provided for allowing a regulator hose 64 to be inserted therein and connected to the combustion/heat exchanger device 50 for purposes of supply combustible fuel, preferably propane, thereto. Opening 62 is provided for facilitating connection of the electrical power supply cord 66 (shown with a standard outlet plug 68 on the distal end thereof) to a controller 70, as shown in FIG. 6. The controller 70 is mounted on top of a partition structure 59. The partition structure also serves to support a grid barrier or baffle 57 which is provided to prevent the mesh bag 40 from contacting the fan 54. Additionally, a duct formed within the partition structure 56 is communicated between the mesh bag 40 and the intake nozzle 22 to provide a continuous flow path from the inlet 26 to the mesh bag 40. Further, a filter 61 is provided to ensure the air that is passed over the combustion/heat exchanger device 50 is exhausted out of the device 10. The filter is constructed of a metallic mesh fabric, however, more broadly, any suitable filtering method would be acceptable.

Figure 7:
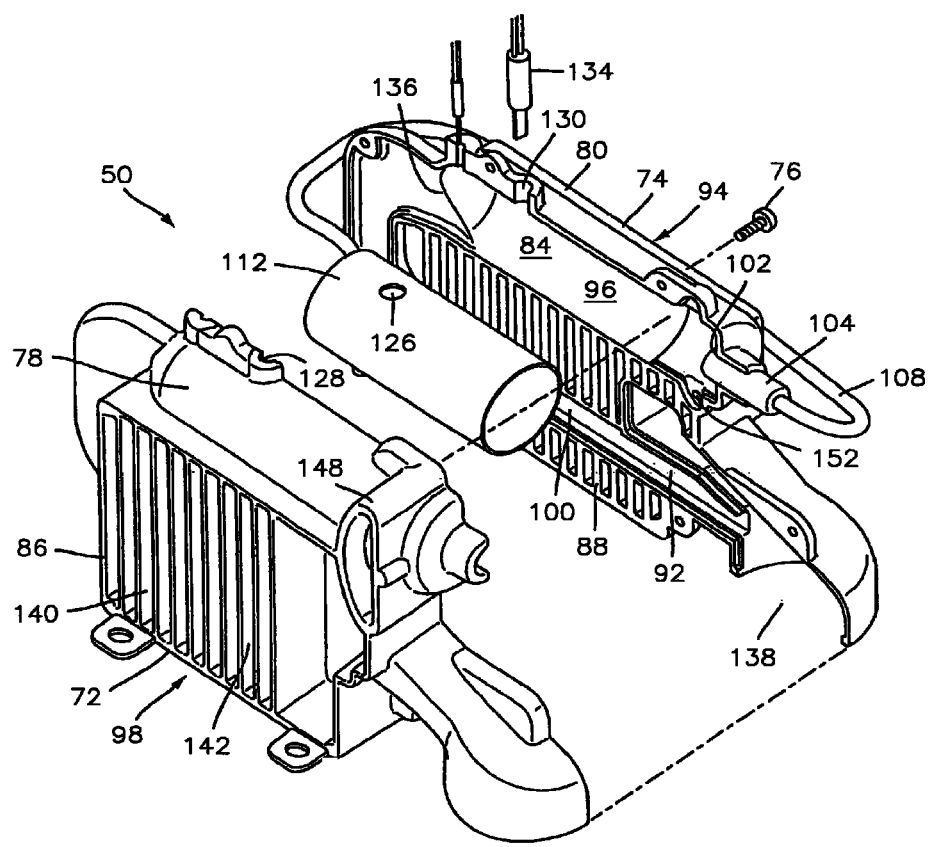
FIG. 7 is an exploded view of a combustion/heat exchanger device used in the device of FIG. 2.
Figure 8:
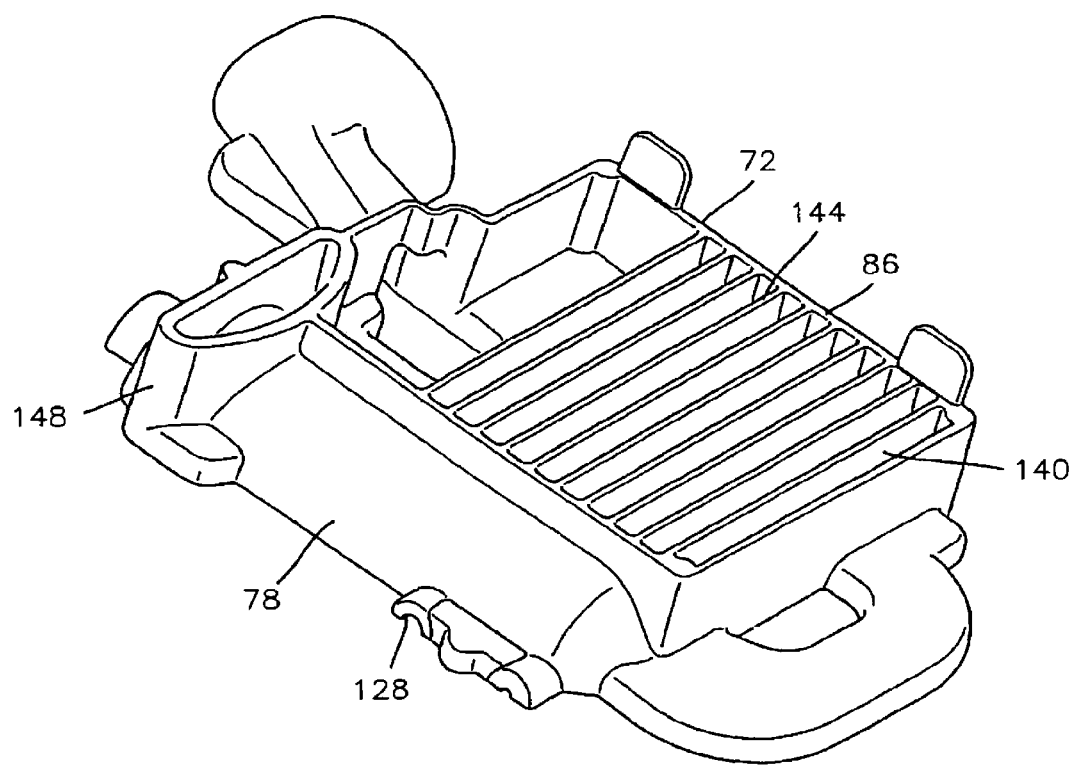
FIG. 8 is a perspective view of a right half of the combustion/heat exchanger device of FIG. 7 taken from the exterior thereof.

Referring now to FIG. 7, the combustion/heat exchanger device 50 comprises a pair of halves 72, 74 (see FIG. 8 for half 72 and FIG. 9B for half 74), each formed from a heat conductive material, such as steel or any other metal. These halves 72, 74 are fastened together by a series of fasteners, such as the threaded cap screw 76. Alternatively, welding or other fastening arrangements may be used. In the illustrated embodiment, the halves 72, 74 are each cast from steel, but any suitable heat conductive material or method of forming may be used. Each half 72, 74 has a partial combustion chamber portion 78, 80 each defining a partial combustion chamber 82, 84 (see FIG. 9A for partial chamber 82), and a partial heat exchanger portion 86, 88 each defining a partial heat exchanging path 90, 92 (see FIG. 9A for partial path 90). During assembly, the two halves 72, 74 are coupled together such that (a) the partial combustion chamber portions 78, 80 are coupled to define a combustion chamber portion 94 of the device 50 and the partial combustion chambers 82, 84 are coupled to define a combustion chamber, generally indicated at 96, extending through the combustion chamber portion 94 and (b) the partial heat exchanger portions 86, 88 are coupled to define a heat exchanger portion 98 and the partial heat exchange paths 90, 92 are coupled to define a heat exchange path, generally indicated at 100, communicated to the combustion chamber 96.

The combustion chamber 96 has an inlet port 102. A fuel nozzle 104 is received in the inlet port 102. The nozzle 104 is of a conventional type and has a spray angle of approximately 45 degrees. The spray nozzle 104 is communicated to a solenoid manifold 106 (shown in FIG. 5) mounted on the rear portion of the combustion/heat exchanger device 50 by an elongated tube 108. The proximal end of the regulator 64 (shown in FIG. 6) connects to the solenoid manifold 106 and the manifold establishes fluid communication between the fuel supply (i.e. propane tank 12) and the nozzle 104, thereby providing for delivery of the combustible fuel to the nozzle 104 and hence the combustion chamber 96. A fuel regulator in the form of a solenoid valve 110 moves between an open position for enabling the fuel to flow through the manifold 106 for delivery to the nozzle 104 and a closed position for preventing the fuel from flowing through the manifold 106, and thus preventing it from flowing to the nozzle 104. The solenoid valve 110 includes a spring (not shown) biasing the valve towards its closed position. The solenoid valve 110 is electrically communicated to the controller 70 and the controller 70 normally transmits electrical signals to energize the solenoid valve 110 and move it to its open position when the power cord 66 is plugged into an electrical power supply. Under certain operating conditions, as dictated by the control scheme that is discussed herein below, the controller 70 will interrupt the aforementioned electrical signal in order to cause the spring to move the valve 110 to its closed position for the purpose of preventing further fuel flow to the nozzle 104 and the combustion chamber 96.

Although, as described above, the fuel regulator or solenoid 110 provides a continuous flow of fuel to the combustion chamber 96, the controller 70 may be programmed to control the solenoid so that it provides a pulsed (intermittent) flow of fuel during operation to the nozzle 104 at the inlet port 102. The pulsed flow of fuel would have a particular predetermined fixed duty cycle, which may be chosen to conserve fuel. As would be understood by a person skilled in the art, by choosing a particular rate and duty cycle for the fuel flow through the solenoid, the flow of fuel out of solenoid 110 may be continuous as perceived by the combustion chamber 96. That is, the solenoid's operation may be manipulated so that the flow of fuel to the chamber 96 is essentially continuous even though it is being delivered in intermittent pulses through the nozzle 104. The pulsed fuel flow allows the opening of the nozzle 104 to be larger while supplying the same amount of fuel over time. In this manner, the nozzle 104 may be less expensive to manufacture and may also be less likely to get blocked by particles within the fuel or that may be encountered during manufacturing/assembly processes.

In an embodiment, the duty cycle for the solenoid may be 5 Hz with an on time of 40 ms. Additionally, the average fuel flow rate may be 140 sccm (standard cubic centimeters per minute) and the nozzle diameter may be 0.09 inches. These values are not intended to be limiting in any way and are only provided to show an example of the settings that may be used in an embodiment.

Figure 10:
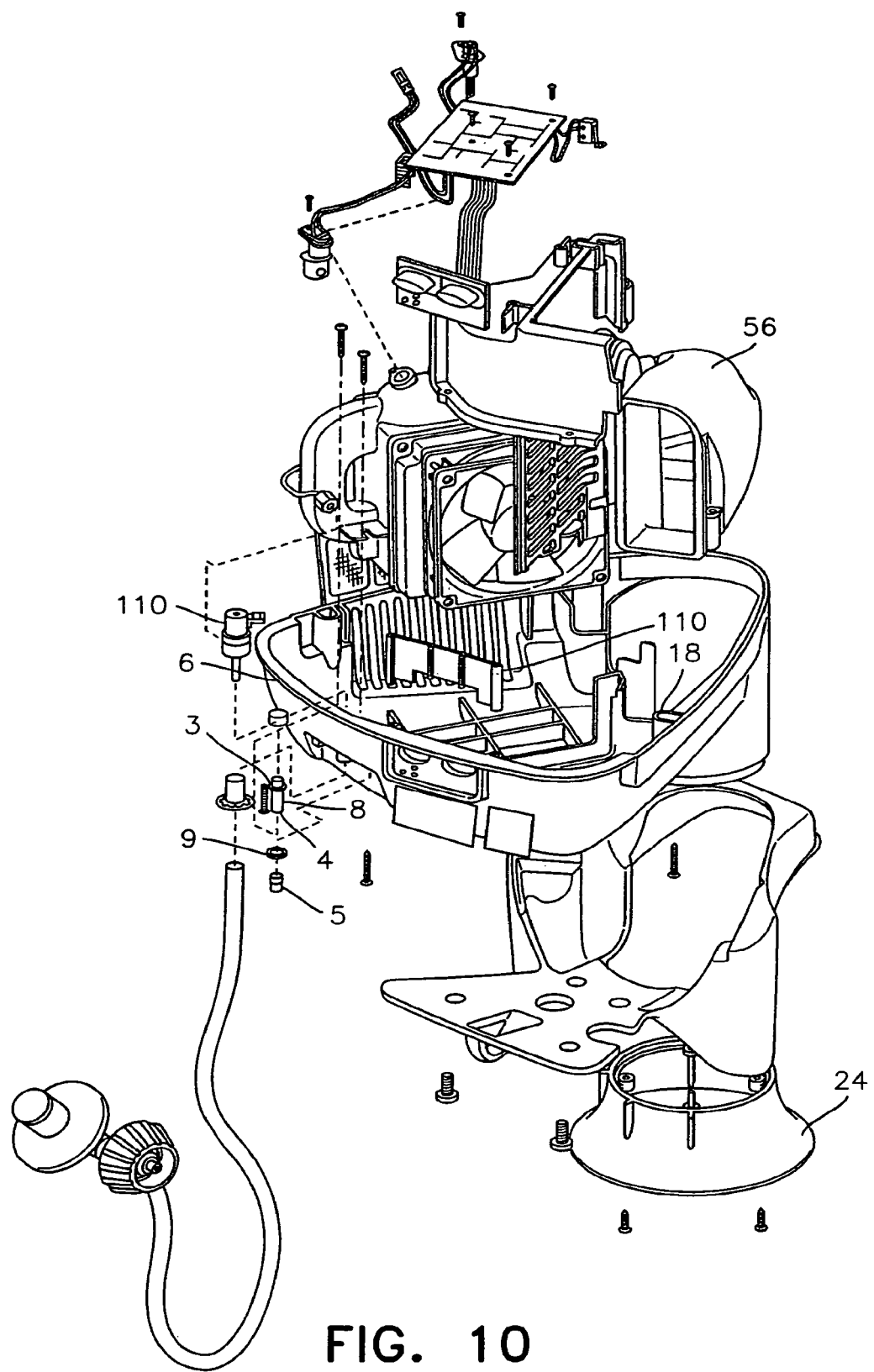
FIG. 10 is an exploded view of an embodiment of a fuel regulator of the device of FIG. 2 and components associated therewith.
Figure 11:
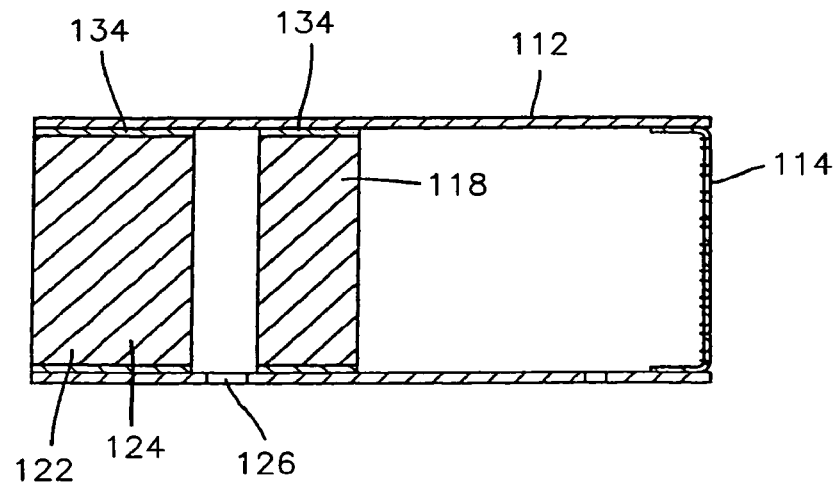
FIG. 11 is a cross-sectional view taken along line 11-11 of FIG. 12.
Figure 12:
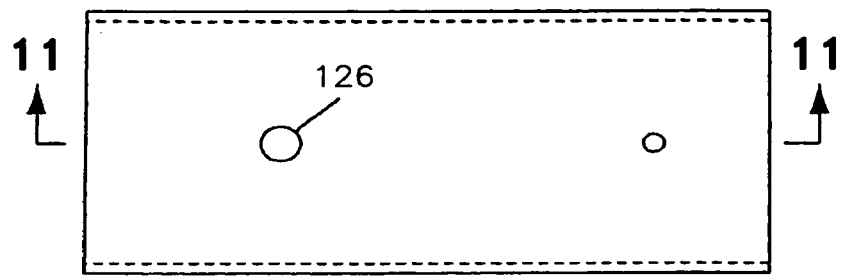
FIG. 12 is a top view of the sleeve used in the combustion/heat exchanger device of FIG. 7.
Figure 13:
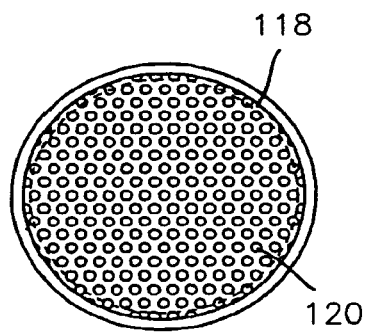
FIG. 13 is a cross-sectional view of the ceramic monolith of FIG. 11.
Figure 14:
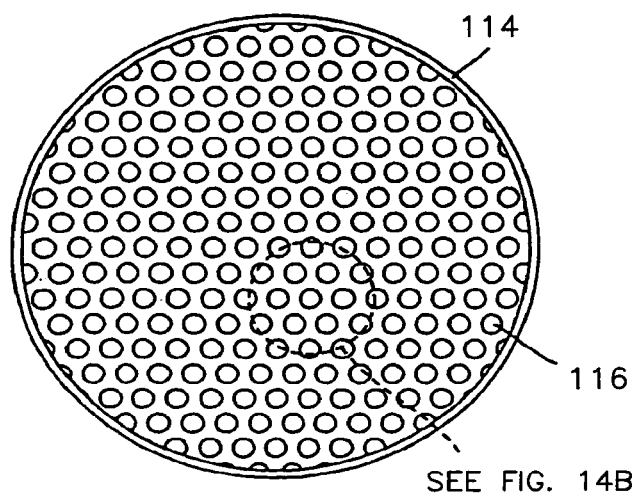
FIG. 14 is an end view of the diffuser plate used in the sleeve of FIG. 11.
Figure 14A:
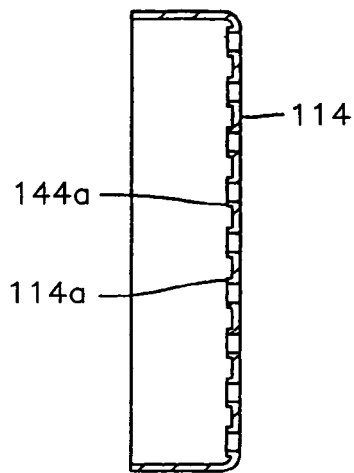
FIG. 14A is a cross-section of the diffuser plate of FIG. 14.
Figure 14B:
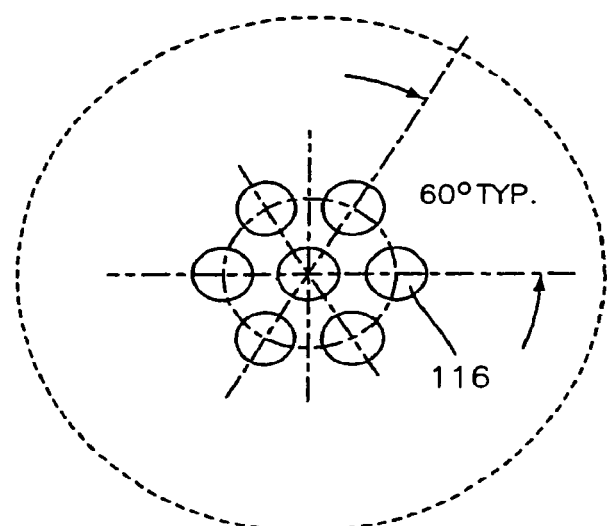
FIG. 14B is a detailed view of subject matter shown in FIG. 14A.

Additionally, as shown in FIG. 10, a valve assembly comprising a tube 6 and a valve 8 may be provided within the fuel delivery apparatus to enable flushing of the fuel delivery apparatus, including the solenoid 110 and the nozzle 104, by a fluid such as a gas or a liquid. Additionally, the valve assembly may include a valve nut 9. Specifically, the valve body 4 extends through a hole in the wall of the housing 18 and has a flange 3 engaging one side of the wall. The nut 9 is threaded onto a threaded part of the valve body 4 so as to secure the valve by the engagement of the housing wall between the nut 9 and the flange 3. A cap 5 is threaded onto the distal end of the valve for protecting the valve. As would be understood by a person skilled in the art, particles may be contained within the fuel and may cause a reduction or blockage of fuel to flow to the chamber 96. This valve can be used to connect the fuel delivery apparatus to a source of pressurized gas (e.g., air) or liquid (e.g., water) to enable the gas or liquid to flow through the fuel delivery apparatus and then through the combustion device 50 and out the exhaust outlet. This will flush the trapping device 10 out to remove any particles. Also, flushing the apparatus may be desirable prior to storing the trapping device 50 to ensure no fuel is left in the device 50. In embodiments, the valve may be a one-way valve which would allow air or liquid into the system but would be sealed from the inside, i.e. when not in use, the valve would not allow fuel to leave the system. As an example, the valve 8 may be of the conventional type used on bicycle/automotive tires (e.g., a stem valve).

Additionally, although the valve assembly is shown coupled upstream of the solenoid 110 so that it will flush both the combustion device 50 and the solenoid 110, it should be understood that the valve assembly may be coupled to the system at any point within the fuel delivery apparatus. Further, in embodiments, more than one valve assembly may be provided. Additionally, the valve could be communicated directly with the combustion device 50 so that only the combustion chamber is flushed. The use of the solenoid valve 110 and/or the valve is an optional feature and should not be considered limiting.

Referring now to FIGS. 11-15, the combustion chamber 96 has a tubular sleeve 112 mounted therein. A relatively thin diffuser plate 114 is mounted within the sleeve 112 at the end thereof that is adjacent the nozzle 104. The diffuser plate 114 has a plurality of apertures 116 punched therethrough, best seen in FIG. 14. The punching of these apertures 116 forms a series of flanges 114a extending outwardly from the downstream side (with respect to fuel flow) of the plate 114. An uncoated, catalytically inactive ceramic monolith 118 is positioned within the sleeve 112 downstream from the diffuser plate 114 in spaced apart relation therefrom. The ceramic monolith 118 has a series of elongated essentially linear conduits 120 formed through the length thereof. These conduits 120 are best seen on FIG. 13 and in the illustrated embodiment there are 400 of them, although any amount may be used. Finally, a catalyst element 122 is positioned within the sleeve 112 in spaced apart relation from the ceramic monolith 118. The catalyst element 122 includes a monolithic catalyst body 124 formed of ceramic and coated with a catalytically active material, such as platinum. The body 124 has a plurality of elongated essentially linear conduits formed through the length thereof in a fashion similar to monolith 118. The distribution of these conduits are similar to those on the ceramic monolith 118, except that in the illustrated embodiment there are 100 conduits in the catalyst body, although any number may be used.

The tubular wall of the sleeve 112 has an igniter receiving hole 126 formed therethrough and positioned between the catalyst body 124 and the ceramic monolith 118. During assembly, the sleeve 112, with the plate 114, monolith 118, and body 124 preassembled therein, is positioned in one of the partial combustion chambers 82, 84 prior to coupling the same together. Each of the partial combustion chamber portions 78, 80 has a partial igniter receiving hole 128, 130 formed on the upper edge thereof, which when coupled together define an igniter receiving hole. The igniter receiving hole 126 of the sleeve 112 is aligned with the igniter receiving hole defined by partial holes 128, 130 so that an igniter 134 can be inserted through the holes and positioned in between the body 124 and the monolith 118. The igniter 134 is powered by the electricity delivered from the controller 70 and creates a spark that ignites a fuel/air mixture flowing between the monolith 118 and the catalyst body 124. During operation, as the fuel/air mixture continues to flow to the catalyst body 124, the fuel/air mixture will be continuously combusted. This region is referred to as the combustion point. The combustion point is located downstream of the monolith 118 and the diffuser plate 114.

Broadly speaking, during operation, the catalyst body 124 is raised to a temperature that enables continuous combustion of the fuel/air mixture being delivered thereto. That is, at its operating temperature, the catalyst body 124 is hot enough to burn the fuel/air mixture thereto, which in turn continues to maintain the catalyst body 124 at an elevated temperature. During combustion, the catalytically active material helps to convert any carbon monoxide in the resulting exhaust gas to carbon dioxide. The combustion may occur within the catalyst 24 or may occur before the catalyst body 24.

Figure 15:
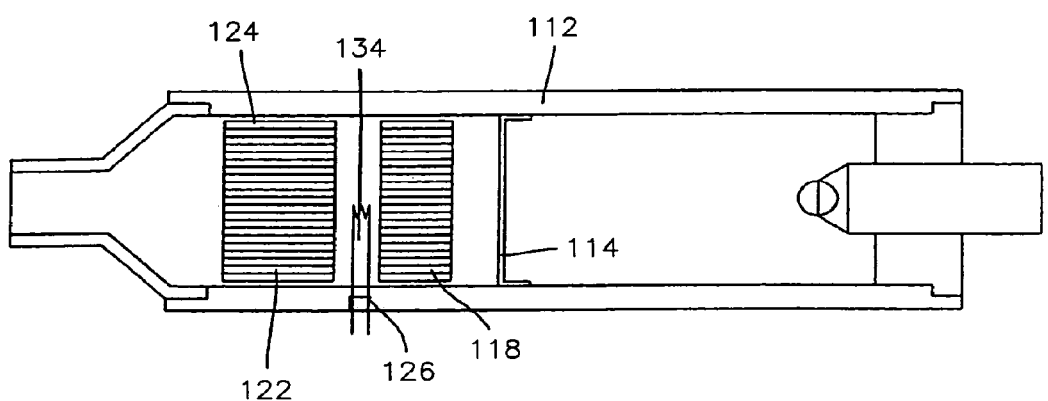
FIG. 15 schematically illustrates the layout of components within the combustion/heat exchanger device.

The combustion operation occurs as follows, with reference being made for best understanding to FIG. 15. The fuel (i.e., propane) is sprayed into the upstream end of the combustion chamber 96 and pressurized air is also forced into the upstream end of the chamber 96 for mixture with the fuel. The manner in which the air is supplied will be described below with reference to the function and operation of the fan 54 and the heat exchanger portion 98, because the pressurized air is derived from the fan 54. The fan 54 may be in communication with the controller 70 such that the controller 70 controls the fan 54 to adjust the delivery of air into the upstream end of the chamber 96. Delivery of pressurized air to the upstream end of the chamber 96 creates a turbulent mixture of fuel and air. At this point, turbulence is desirable to ensure that the fuel and air mix together thoroughly. However, turbulence is undesirable at the combustion point. Thus, the diffuser plate 114 functions to initially reduce the turbulence and thus initially "straightens" the flow. Specifically, as the mixture flows downstream through the apertures 116 formed through the plate 114, the apertures, and particularly the flanges extending downstream therefrom, function to "align" the mixture flow in the downstream direction and reduce the turbulence thereof, thus making the flow somewhat more laminar. As the mixture continues to flow downstream, it enters the conduits 120 of the ceramic monolith 118. The elongated, essentially linear configuration of these conduits 120 eliminates essentially all the turbulence and provides an essentially laminar flow of fuel/air mixture to the combustion point. Because the fuel and air have been thoroughly mixed upstream while in a highly turbulent state, the mixture delivered by the monolith 118 to the combustion point is essentially homogeneous. A homogeneous and laminar mixture flow is desirable for ensuring that all the fuel is burned during combustion. Specifically, a homogeneous flow provides for even combustion of all the fuel and air present at the combustion point and laminar flow prevents "pockets" of unburned fuel from passing through with exhaust gas, as may happen if the mixture were highly turbulent during combustion. This is desirable to avoid the presence of fuel in the ultimate exhaust gas, as the presence of fuel is believed to be ineffective at attracting flying insects, and in fact may be a repellent.

The air fuel mixture is burned by combustion to create a heated exhaust gas. This exhaust gas includes, among other things, carbon dioxide and some carbon monoxide. As the exhaust gas flows through the catalyst body 124, the catalytically active material causes a reaction to occur whereby the carbon monoxide present in the gas is converted to carbon dioxide. A by-product of this reaction, commonly referred to as catalytic conversion, is also the creation of water (in vaporized form) in the exhaust gas. The manner in which this reaction occurs is well known and need not be described in further detail. The reason for providing this reaction is to eliminate, as much as possible, the presence of carbon monoxide in the exhaust gas, as it is known that carbon monoxide is a repellent to mosquitoes and other flying insects. The presence of water in the exhaust gas is an advantageous, although not necessary, result of the catalytic conversion reaction because the resulting exhaust gas will better mimic the exhalation of a mammal, which is typically moist due to presence of water. The use of a catalyst body 124 with a plurality of elongated conduits is advantageous in that it provides for increased exposure of the heated exhaust gas to the catalytically active material coated thereon.

Broadly speaking, the plate 114 and the monolith 118 can be said to constitute a turbulence reducing structure. The turbulence reducing structure having a plurality of apertures, constituted by the conduits 120 and the apertures 116 in the illustrated embodiment, oriented in the same general direction as the conduits of the catalyst body 124. As discussed above, these apertures are configured to straighten the flow of fuel from said inlet port to thereby reduce turbulence in said fuel prior to reaching the combustion point.

Preferably, an insulating material 134 is provided between both the monolith 118 and the catalyst body 124 and the interior surface of the sleeve 112.

The combustion chamber 96 has an exhaust port 136 downstream from the sleeve 112 that opens to the heat exchange path 100. The exhaust gas flows through the exchange path 100 to an exhaust outlet 138 of the combustion/heat exchange device 50. As the gas flows along this path 100, it transfers heat to the heat conductive material of the heat exchange portion 98.

The heat exchanger portion 98 includes a plurality of vertically oriented heat exchanging fins 140 separated by a plurality of vertical openings 142. The heat transferred from the gas is conducted to these fins 140 and the fan 54 causes air to flow through the openings 142 as described below. The air flowing through these openings 142 cools the fins 140 and absorbs the heat transferred from the exhaust gas. Optimally, the temperature of the exhaust gas as it exits the exhaust port 138 should be around ambient temperature and preferably no greater than 115° F. Even more preferably, the exhaust gas temperature should be no greater than 5-15° F. greater than ambient. As a result, the end product of the process is an exhaust gas that is an excellent simulation of mammalian exhalation—it contains carbon dioxide, moisture from the presence of water, and has a temperature around or slightly above ambient, which is typical of mammalian exhalations. Further, the catalytic conversion reaction minimizes or eliminates the presence of carbon monoxide. Thus, the resulting exhaust gas is a superior attractant for mosquitoes and other flying insects that prey on the flesh or blood of mammals and that "home in on" mammalian exhalations to locate their prey.

The function and operation of the fan 54 will now be described. The fan 54 is powered by an electrical signal delivered by the controller 70, which as mentioned above is powered by electrical power delivered by cord 66. The use of a power cord 66 for connection to an external power source is not a necessary feature of the invention and the power for driving the fan 54 and any other components may be derived from other sources, such as batteries, solar panels, or the conversion of thermal energy from the combustion process into electrical energy, as is disclosed in the above-incorporated '243 patent.

The fan plenum 52 mounts to the combustion/heat exchanger device 50 by a series of fasteners or other suitable attachment means, such as an adhesive or snap fit features. The plenum 52 basically encloses one side of the device 50 and provides a mounting point for attachment of the fan 54. A large circular opening 144, which is best shown in FIG. 6, in the plenum 52 allows the fan 54, which draws air from the insect intake port 26 through the duct 56 and the opening 34 for the mesh bag 40, to cause air to flow from the fan 54 through the opening 144 and to the openings 142 of the combustion/heat exchanger device 150 and out the filter 61. Thus, the fan 54 functions to both cool the fins 140 and create the vacuum for drawing insects into the insect intake port 26. However, any device suitable for creating a vacuum may be used and the provision of a single fan 54 is just one example of a suitable vacuum device. Further, in the broadest aspects of the invention, the same device need not be used to both create the vacuum and supply air to the combustion chamber.

Figure 9A:
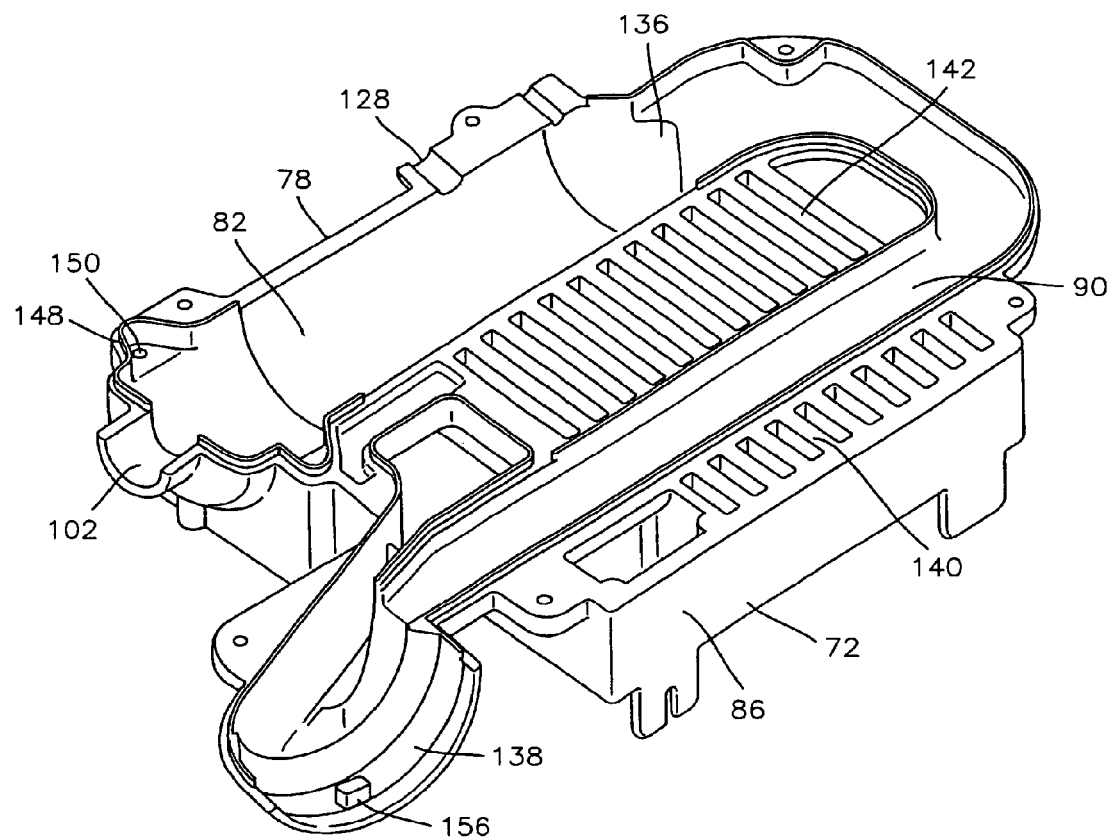
FIG. 9A is a perspective view of a right half of the combustion/heat exchanger device of FIG. 7 taken from the interior thereof.
Figure 9B:
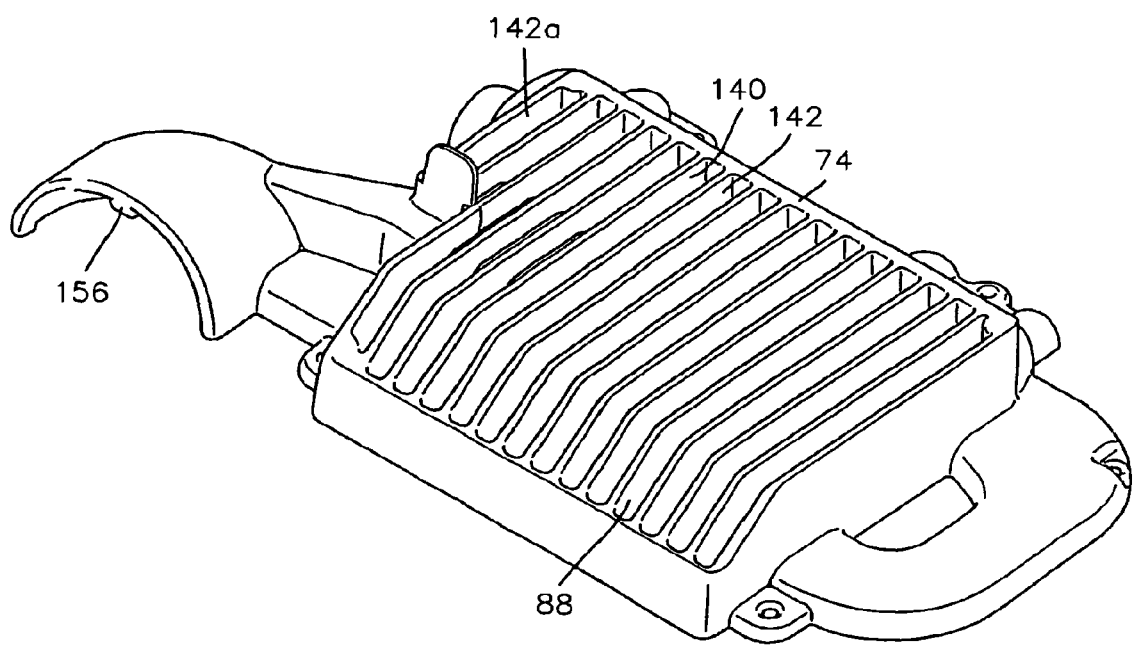
FIG. 9B is a perspective view of the left half of the combustion/heat exchanger device of FIG. 7 taken from the exterior thereof.

On the forward portion of the plenum 52 is an air supply portion 146 that couples over a corresponding air supply portion 148 on the combustion/heat exchanger device 50, also shown in FIG. 6. As can be seen in FIG. 9A, portion 148 has an upper opening 150 that communicates with the upper portion of the combustion chamber 96. Also, as can be seen in FIG. 7, portion 148 has a lower opening 152 that communicates with the lower portion of the combustion chamber 96. Opening 152 opens to the downstream side (relative to the airflow drawn by the fan 54) of the device 50 through opening 142a (shown in FIG. 9B) and thus is communicated with the filter 61. Opening 150 opens to the upstream side of the device 50 through the air supply portion 148 thereof and thus communicates with the fan plenum 52 and the fan 54. As a result of this construction, the fan 54 enables ambient air to be delivered to the combustion chamber 96 by forcing ambient air through the chamber 96 via openings 150 and 152. At that juncture, the air forced in as such mixes with the fuel delivered by nozzle 104 for combustion according to the process described above.

Figure 16:
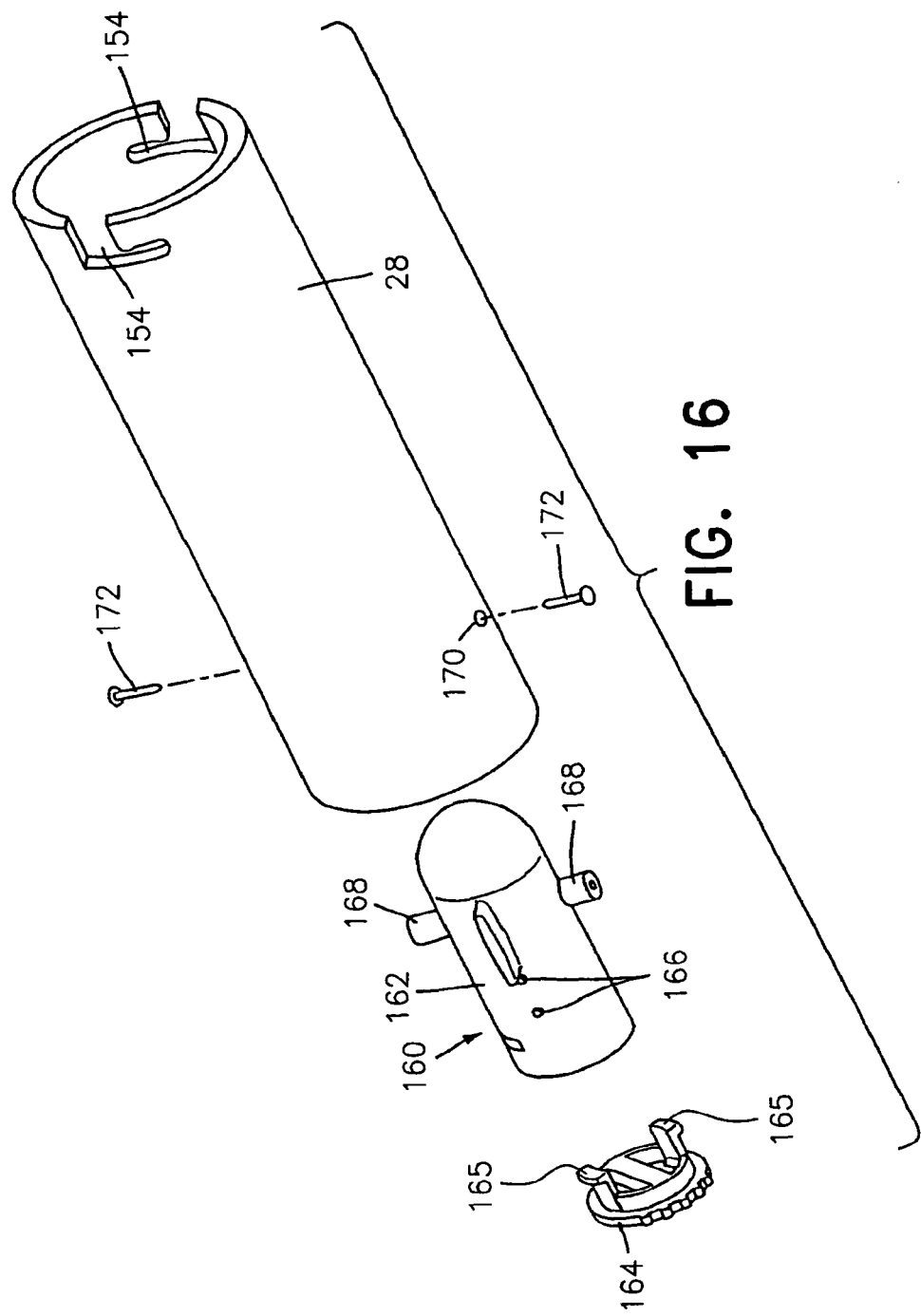
FIG. 16 is an exploded view of an outlet nozzle of the device of FIG. 2 and the components associated therewith.

FIG. 16 illustrates the outlet nozzle 28, which in the illustrated construction is removable, although removability is not a necessary feature. The upper end of the nozzle 28 has a pair of lug receiving slots 154 that are each essentially L-shaped. These lug receiving slots 154 enable the nozzle 28 to be mounted to the lugs 156 provided on the internal periphery of the exhaust outlet port 138 for the combustion/heat exchanger device 50. These lugs 156 can be best seen in FIGS. 9A and 9B. The nozzle 28 is mounted by aligning the open ends of the slots 154 with the lugs 156, moving the nozzle 28 axially upwardly until the lugs 156 reach the bottom of the slots 154, and then rotating the nozzle 28 in a clockwise direction.

In an embodiment, a supplemental insect attractant element 160 is mounted in the lower end of the nozzle 28. The insect attractant element 160 includes a housing 162 and a cap 164 for closing the open bottom end of the housing 162. The cap 164 has snap-in elements 165 for releasably securing it within the housing 162. The attractant used inside the housing may be octenol or any other material that mimics a mammalian smell (or any other material) that will assist in attracting mosquitoes and other flying insects. For example, in an embodiment, the attractant may be LUREX™, which is sold by the assignee of the present application, Woodstream Corporation of Lititz, Pa. LUREX™ includes lactic acid and has been found to attract certain species of mosquitoes. The housing 162 has a plurality of openings 166 for enabling the attractant to mix with the exhaust gas and become part of the exhaust flow. The housing 162 has a pair of internally threaded portions 168 that align with openings 170 on the nozzle 28. A pair of screws 172 are inserted into these openings and into the threaded portions 168 to releasably attach the housing 162. When the user desires, the attractant can be removed and replaced as needed by removing the nozzle 28 and opening the cap 164 to access the housing interior.

The foregoing description of the illustrated device 10 and the components thereof is only one example of a flying insect trapping device and is in no way intended to be limiting. To the contrary, the illustrated device 10 is described to provide a working example for explaining the context of the inventions disclosed in this application. Thus, any invention disclosed may be practiced with any suitable insect trapping device, and is not limited to the example device 10 described. For example, reference may be made to other U.S. Patents and Patent Application Publications by the assignee Woodstream Corporation for various examples of insect traps. See, for example, U.S. Pat. Nos. 5,669,176, 5,813,166, 6,145,243, 6,286,249, 6,840,005, and 6,892,492, and United States Patent Application Publication Nos. 2003/0084604, 2004/0001870, 2004/0139648, 2004/0237381, 2004/0237382, 2004/0244276, 2005/0019361, 2005/0210737, and 2005/0268529, each of which is incorporated herein by reference. The inventions are not limited to use with Woodstream Corporation devices, and may be practiced with any insect trapping device manufactured by anyone.

Attractant Dispenser

Figure 17:
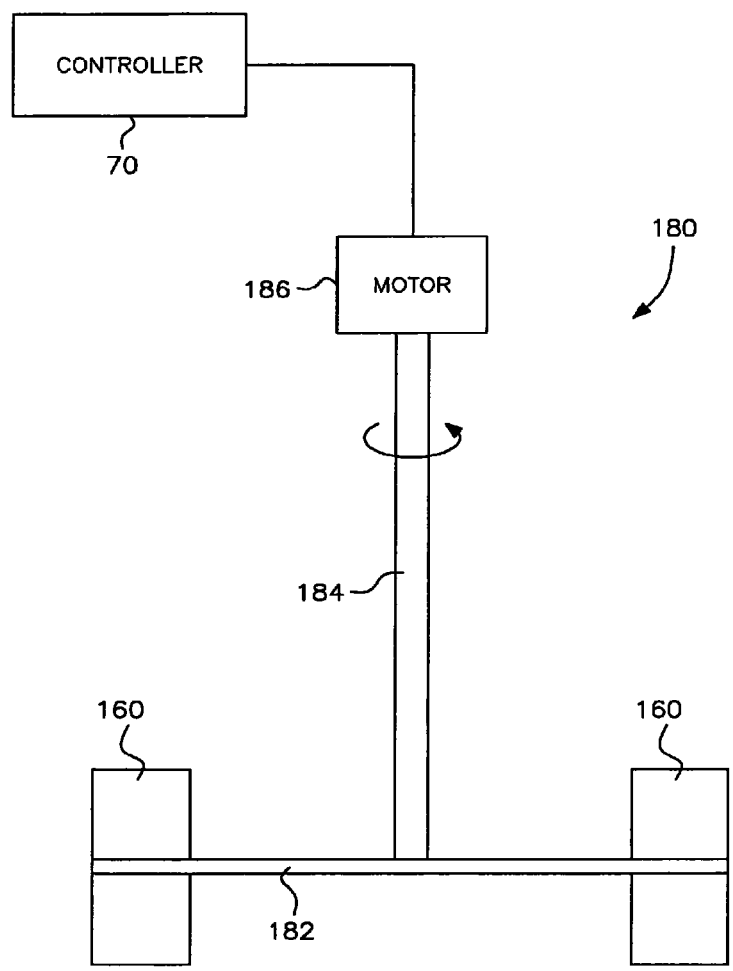
FIG. 17 is a schematic of an embodiment of an attractant dispenser of the device of FIG. 2.

In an embodiment, illustrated in FIG. 17, the device includes an attractant dispenser 180 that is configured to allow the device to select between the use of one of a plurality of attractants. For example, the attractant dispenser 180 may include a plurality of insect attractant elements 160, as described above, that may be placed into a position in which the attractant is able to mix with the exhaust gas and become part of the exhaust flow. The attractant dispenser 180 communicates with the controller 70 such that when the controller 70 determines that a particular insect attractant should be placed into an operative position for use, the controller 70 signals the attractant dispenser 180 to move the corresponding insect attractant element 160 into the operative position. For example, if the controller 70 determines that the conditions are such that LUREX™ should be mixed with the exhaust gas, but octenol is currently being mixed with the exhaust gas, the controller 70 would provide the attractant dispenser 180 with a series of commands that direct the attractant dispenser 180 to move the insect attractant element 160 that contains octenol out of the operative position, and move the insect attractant element 160 that contains LUREX™ into the operative position.

As shown in FIG. 17, the attractant dispenser 180 may include a holder 182 that is connected to a shaft 184. In the embodiment illustrated in FIG. 17, the holder 182 is configured to hold two insect attractant elements 160 away from the shaft 184. The holder 182 may be sized to extend the insect attractant element 160 to the nozzle 28 so that the insect attractant may diffuse into the exhaust flow. The shaft 184 may be mounted to the device 10 in a located that allows minimal obstruction to the intake nozzle 22, while still providing the insect attractant contained within the insect attractant element 160 to the exhaust flow. The shaft 184 may be connected to a motor 186 that is in communication with the controller 70. When the controller 70 determines that the insect attractant should be changed, the controller 70 may signal the motor 186 to rotate the shaft 180°, thereby positioning the other insect attractant in the exhaust flow. Of course, the attractant dispenser 180 may be configured to hold more than two insect attractant elements, and may have a different configuration and components to position the appropriate insect attractant in the exhaust flow. The illustrated embodiment is not intended to be limiting in any way.

Figure 18:
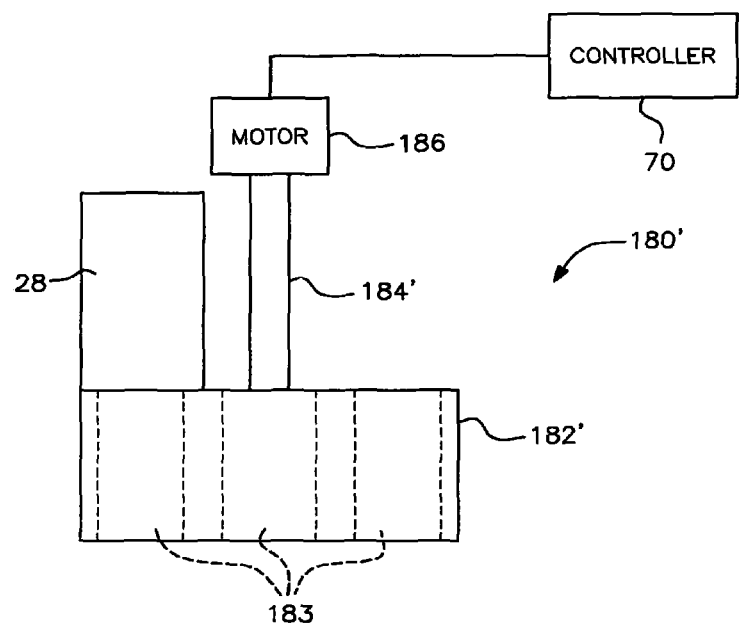
FIG. 18 is a schematic of another embodiment of the attractant dispenser of FIG. 17.
Figure 18A:
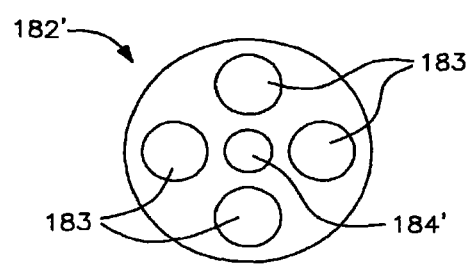
FIG. 18A is a top view of an embodiment of an attractant holder of the attractant dispenser of FIG. 18.

Another embodiment of an attractant dispenser 180' is shown in FIG. 18. In this embodiment, the attractant dispenser 180' includes a holder 182' and a shaft 184' that is connected to the holder 182'. The shaft 184' may be connected to the motor 186 for rotating the holder 182'. The holder 182' includes a plurality of openings 183, as shown in FIG. 18A, that are each configured to hold an insect attractant and/or a cartridge containing an insect attractant, much like a revolver holds a plurality of bullets. As shown in FIG. 18, the holder 182' is configured to align a selected attractant with the nozzle 28 through which the exhaust gas flows out of the device 10. This allows the selected attractant to diffuse into the exhaust gas as the exhaust gas exits the device 10.

In the illustrated embodiment, the holder 182' includes four openings 183 for holding four insect attractants. The four insect attractants may be any combination of insect attractants. For example, each of the four insect attractants may be the same type of insect attractant, and the dispenser 180' may be used to increase the capacity of the particular insect attractant in the device 10. Alternatively, each of the four insect attractants may be different, i.e., each particularly formulated for attracting a different, specific insect.

Although the illustrated embodiments of the attractant dispensers 180, 180' are shown to align the selected attractant with the exhaust flow of the device, in an embodiment, the attractant dispensers 180, 180' position the selected attractant so that the attractant is in communication with the exhaust flow. In other words, the attractant may not need to be physically placed in the exhaust flow, but should be placed near the exhaust flow so that the attractant may diffuse into the exhaust flow and away from the device. The illustrated embodiments are not intended to be limiting in any way.

Sensors

Embodiments of a plurality of sensors that are described below may be used alone or in any combination, and the descriptions of such sensors are not intended to be limiting in any way.

a. Twilight Sensor

Figure 19:
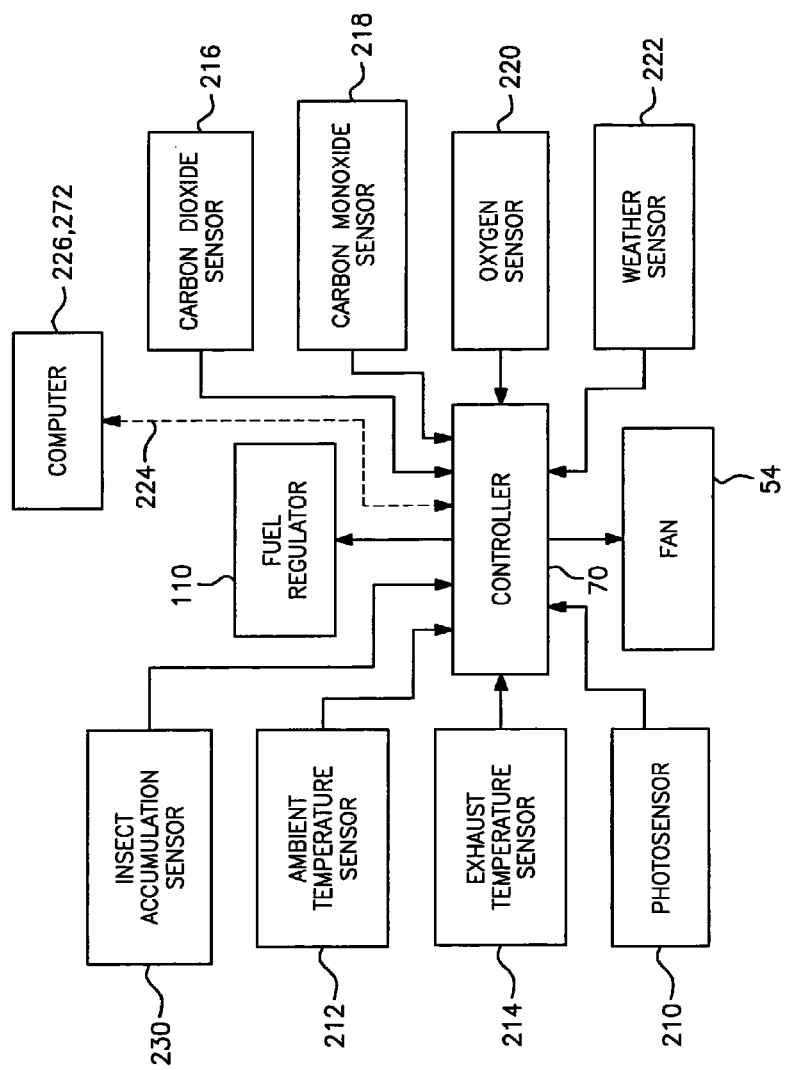
FIG. 19 is a schematic of a plurality of sensors that may be used in embodiments of the device of FIG. 2.

In an embodiment of the invention, the device 10 also includes a photosensor 210 that is located on an exterior of the device 10 and is configured to detect ambient light. The photosensor 210 may be a photocell or any other type of sensor that generally senses light. As shown in FIG. 19, the photosensor 210 is in communication with the fuel regulator 110 and the fan 54 via the controller 70. The fuel regulator 110 is configured to increase or decrease the flow of the fuel being provided to the inlet port of the combustion device, and the fan 54 is configured to increase or decrease the flow of the air being provided to the combustion device based on the detection of the photosensor 210. For example, because the biting activity of mosquitoes tends to be lower in the middle of the day and also tends to significantly increase at dusk when the ambient light decreases, when the photosensor 210 senses that the amount of ambient light has significantly decreased, the photosensor 210 provides a signal to the controller 70 in the form of a current or voltage. Upon receiving this signal, the controller 70 may signal the fuel regulator 110 to increase the flow of the fuel from the fuel supply to the inlet port 102, and at the same time, the controller 70 may signal the fan 54 to increase the flow of the air to the combustion device 50 by an appropriate amount based on the increase in fuel flow. The controller 70 may be programmed so that the adjustments to the fuel flow and the air flow may be made without disrupting the carbon dioxide signal being provided by the device 10.

Similarly, when the photosensor 210 senses that the amount of ambient light has increased to a level that is above a predetermined threshold value, such as at daybreak, rather than turning the device 10 off, the controller 70 is configured to provide a signal to the fuel regulator 110 to reduce the flow of the fuel to a non-zero level and the fan 54 is configured to reduce the flow of the air to a non-zero level. Again, the controller 70 may be programmed to help ensure that an efficient combustion takes place in the combustion device 50, even at the lower flow rates. This way, the device 10 may still emit a carbon dioxide signal at an appropriate temperature to maintain a carbon dioxide laden area to attract flying insects, while conserving fuel. In addition, when it is time to increase the fuel and air flow rates, the time it will take the combustion device to reach steady state should be less than embodiments in which the fuel flow has been completely shut off.

Of course, other configurations of photosensors and controllers may be used. The described embodiment is not intended to be limiting in any way.

b. Ambient Air Temperature Sensor

In an embodiment, the device 10 includes an ambient air temperature sensor 212, as shown in FIG. 19 for sensing the temperature of the ambient air surrounding the device 10. The temperature sensor 212 may be mounted on the exterior of the device 10 in a location that is away from the exhaust so that a more accurate reading of the ambient temperature may be measured. If the controller 70 determines that the temperature detected by that temperature sensor 212 has fallen below a predetermined temperature, the controller 70 may signal the flow regulator 110 and the fan 54 to decrease the flow rates of the fuel and the air, respectively, being supplied to the combustion device 50. The predetermined temperature may be associated with a temperature at which the targeted flying insects are known to be inactive. For example, if it is determined that the targeted flying insects are known to be inactive at temperatures below 40° F., the controller 70 may be programmed to signal the flow regulator 110 and the fan 54 to decrease the flow rates of the fuel and the air, respectively, being supplied to the combustion device 50 when the temperature sensor 212 senses that the ambient air temperature is below 40° F. Of course, this value is intended to be an example and is not intended to be limiting in any way. In addition, it may be desirable to use the ambient air-temperature for other purposes. The described embodiment is not intended to be limiting in any way.

c. Sensors for Measuring Exhaust Gas Properties

As shown in FIG. 19, the device 10 may include one or more sensors for sensing at least one parameter related to the performance of the device 10. For example, in embodiments of the device 10 that include the combustion device, it may be desirable to operate the device 10 so that the exhaust temperature of the combustion device and the chemical make-up of the exhaust gas are within predetermined ranges. For example, for devices that include a combustion device, it is typically desirable to provide an exhaust gas with a maximum amount of carbon dioxide and a minimum amount of carbon monoxide and oxygen, within a predetermined temperature range. As discussed in greater detail below, the controller 70 is configured to communicate with the sensors and is operable to perform an operation to adjust the temperature and/or chemical make-up of the exhaust gas based on the at least one parameter sensed by the one or more sensors.

In an embodiment, an exhaust gas temperature sensor 214 for sensing the temperature of the exhaust gas may be mounted either in the exhaust port 136 of the combustion device 50, or in the exhaust outlet 30 of the device 10. The exhaust temperature may give an indication of the performance, e.g., efficiency, of the combustion device 50. For example, if the exhaust temperature is sensed to be higher than a predetermined upper temperature, the air to fuel ratio in the combustion device 50 may be too high, and the controller 70 may be configured to reduce the speed of the fan 54 to thereby reduce the flow rate of the air that is being supplied to the combustion device 50 and lower the air to fuel ratio. Similarly, if the exhaust temperature is sensed to be lower than a predetermined lower temperature, the air to fuel ratio in the combustion device may be too low, and the controller 70 may be configured to increase the speed of the fan 54 to thereby increase the flow rate of the air that is being supplied to the combustion device 50 to increase the air to fuel ratio. Other operations may be performed by the controller 70 to improve the efficiency and exhaust temperature of the device 10. The described embodiment is not intended to be limiting in any way.

In embodiments of the device that include both the ambient air temperature sensor 212 and the exhaust gas temperature sensor 214, the difference between the ambient air temperature and the exhaust gas temperature may also be monitored. It has been found that optimizing that difference between such temperatures may increase the number of certain species of flying insects that are attracted to and captured by the device 10. Specifically, it has been found that sandflies are particularly sensitive to the difference in the temperatures of the ambient air and the exhaust gas. Therefore, by adjusting at least the air flow to the combustion device 50, or the air flow for mixing with the exhaust gas itself, to generate the correct exhaust gas temperature for the particular ambient air temperature in which the device 10 is operating, the number of captured sandflies may be increased.

The device 10 may also include sensors that measure the chemical properties of the exhaust gas. For example, the device 10 may include a carbon dioxide sensor 216 for measuring the level of carbon dioxide in the exhaust gas, a carbon monoxide sensor 218 for measuring the level of carbon monoxide in the exhaust gas, and/or an oxygen sensor 220 for measuring the level of oxygen in the exhaust gas. By measuring the chemical properties of the exhaust gas, the efficiency and overall operation of the combustion device 50 may be monitored and optimized. Because carbon monoxide is known to be an insect repellant, it is desirable to minimize the level off carbon monoxide in the exhaust gas. In addition, the level of carbon monoxide in the exhaust gas may also provide an indication as to whether the correct ratio of fuel and air is being provided to the combustion device. For example, if the level of carbon monoxide is sensed by the carbon monoxide sensor 218 to be above a predetermined level, e.g., the stoichiometric point, the air to fuel ratio may be too low, and the controller 70 may be configured to increase the speed of the fan 54 to thereby increase the flow rate of the air that is being supplied to the combustion device 50. This in turn should increase the air to fuel ratio. In an embodiment, the stoichiometric chart may be programmed into the controller 70, so that when the level of carbon monoxide is sensed to be near the stoichiometric point, it is known that the combustion device 50 is operating efficiently and no adjustments should be made, as long as the exhaust temperature is within a desired range. Otherwise, appropriate adjustments may be made to the air flow to move the carbon monoxide level back to a level that is near the stoichiometric point. The use of the carbon monoxide sensor 218 and controller 70 in this manner is not intended to be limited to the described embodiment.

Similarly, if the carbon dioxide sensor 216 senses that the level of carbon dioxide in the exhaust gas is below a predetermined level, the air to fuel ratio may be either too high or too low, and an adjustment to the air flow should be made. In addition, if the oxygen sensor 220 senses that the level of oxygen in the exhaust gas is higher than a predetermined upper limit, then the air to fuel ratio may be too high, and the controller 70 may signal the fan 54 to decrease the air flow to the combustion device 50 to thereby decrease the air to fuel ratio. Conversely, if the oxygen sensor 220 senses that the level of oxygen in the exhaust gas is lower than a predetermined lower limit, then the air to fuel ratio may be too low, and the controller 70 may signal the fan 54 to increase the air flow to the combustion device 50; thereby increasing the air to fuel ratio. Of course any combination of the sensors 212, 214, 216, 218, 220 may be used to monitor and adjust the performance of the device 10. The above described embodiments of the sensors should not be considered to be limiting in any way.

d. Weather Sensor

In an embodiment, at least one weather sensor 222 is provided. As shown in FIG. 19, the weather sensor 222 is configured to communicate with the controller 70. The controller 70 may be configured to adjust at least one operating parameter of the device based on at least one weather condition at the device 10, as measured by the weather sensor 222. The weather condition may include, but is not limited to wind direction, wind speed, relative humidity, rainfall, and temperature. For example, in an embodiment, the weather sensor 222 is configured to detect the wind speed (e.g., an anemometer). If the wind speed is measured to be above a predetermined level, the controller 70 may signal the fuel regulator 110 and the fan 54 to reduce the flow of the fuel and the air, respectively, to a non-zero level until the wind speed is measured to be below the predetermined level. This is useful because many flying insects, and particularly mosquitoes, tend to not fly in high winds. Thus, fuel may be conserved during periods of high wind. In addition, if the weather sensor 222 is configured to detect wind direction and the controller 70 determines that a significant shift in wind direction has occurred and is being maintained, the controller 70 may be configured to alert the user of the device 10 that he/she may wish to consider relocating the device 10.

Similarly, in an embodiment, the weather sensor 222 is configured to measure rainfall, more particularly, the rate of rainfall. If the rate of the rainfall is measured to be above a predetermined level, the controller 70 may signal the fuel regulator 110 and the fan 54 to reduce the flow of the fuel and the air, respectively, to a non-zero level until the rate of the rainfall slows to a level at which it is known that the flying insects would be attracted to the device 10. For example, if the weather sensor 222 senses that rain is pouring down at a rate of 1 inch per hour, the controller 70 may be programmed to signal the fuel regulator 110 and the fan 54 to reduce the flow of the fuel and the air, respectively. During heavy rains, most flying insects are not flying around in search of prey, and thus this feature allows the fuel to be conserved during such periods.

In an embodiment, the controller 70 communicates via a network 224, to a remote computer 272, and weather conditions for the particular location of the device 10 may be monitored via a remote sensor that is provided by a weather information provider, rather than having an on-board sensor. The network 224 may be the same network 2 discussed above, or it may be a different network if the device 10 is used in an individual application. As discussed in further detail below, devices that are used in individual applications may be networked together via wide area networks so that information may be gathered from the devices and compared. In embodiments that include the use of the remote sensor, the weather conditions being measured by the remote sensor may be communicated to the controller 70 via the network 224. The above described embodiments are not intended to be limiting in any way.

e. Insect Accumulation Sensor

As another option, a sensor 230 for monitoring an accumulation of the insects in the device 10 may also be provided. As shown in FIG. 19, the sensor 230 is in communication with the controller 70, and the controller 70 may communicate information received from the sensor 230 to the remote computer 272. The sensor 230 may be a current sensor that senses electrical current flowing through the fan 54, or a voltage sensor that senses voltage across the fan 54. Because the fan 54 is configured to draw air through the bag 40, as the bag 40 fills with insects, the load on the fan 54 will increase. By sensing the current through the fan 54 or the voltage across the fan 54, an indication may be made when the bag 40 is full or nearly full. For example, the indication may be provided by a predetermined current setting that has been determined to correspond to a load on the fan 54 that indicates that the bag 40 is full or nearly full. In addition, the change in current over time may be monitored, and when there is no change over a predetermined amount of time, it may indicate that the bag 40 is full and should be emptied.

The sensor 230 may also be an airflow sensor that senses the rate of the inflow drawn into the insect inlet 26 by the fan 54 or vacuum device. Again, because the fan 54 draws air through the bag 40, as the insects accumulate in the bag 40, the rate of the inflow will decrease. By monitoring the rate of inflow over time, a determination that there has been no change in inflow over a predetermined amount of time may indicate that the bag 40 is full and should be emptied.

In another embodiment, the sensor 230 may be a load sensor that senses the weight of the bag 40 and any contents contained therein. When the load sensor senses that the weight of the bag 40 and its contents are above a level that has been predetermined in accordance with the type of species that is being trapped by the device 10, the bag 40 may be full and should be emptied.

In yet another embodiment, the sensor 230 may be an optical sensor that is constructed and arranged to provide a beam of light through the insect trap chamber and measure an amount of light that passes through the insect trap chamber. When the insect trap chamber is empty, the highest amount of light will pass through. In contrast, when the insect trap chamber is full or nearly full, the lowest amount of light will pass through. When the sensor 230 senses that very little light is passing through the insect trap chamber, the bag may be full and should be emptied.

Of course the above described sensors for monitoring an accumulation of the insects in the device are not intended to be limiting in any way. Any suitable sensor that may be configured to monitor the number of insects being accumulated in the insect trap chamber may be used.

Figure 20:
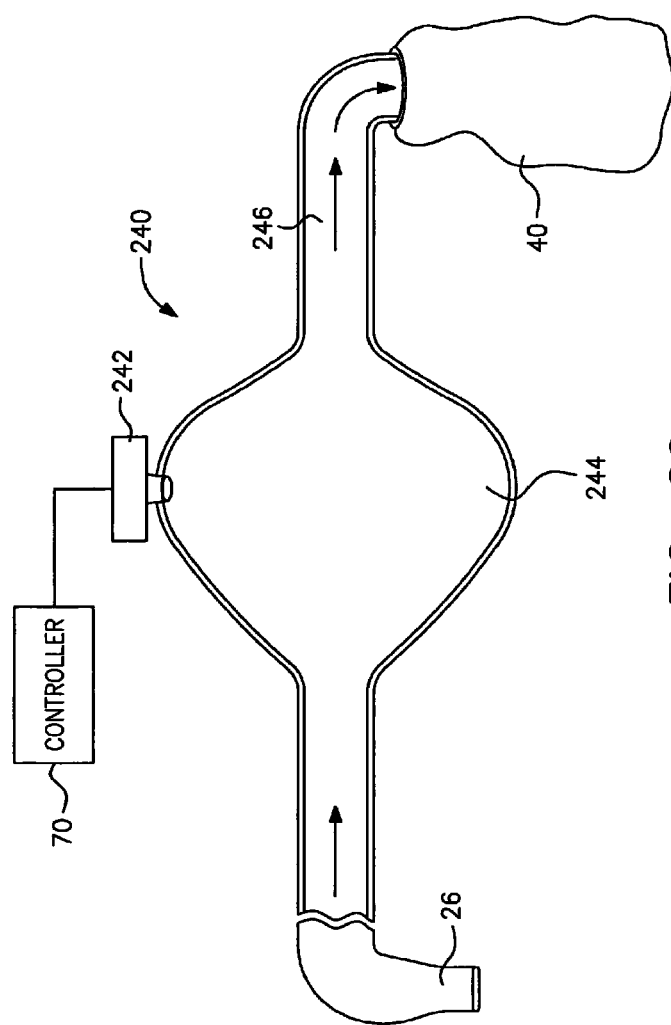
FIG. 20 is a schematic of a monitoring chamber of the device of FIG. 2.

Regardless of which type of sensor 230 is used, the controller 70 may be configured to provide a signal to a user of the device 10, that the bag 40 is full and should be emptied. The signal may be a visual signal in the form of a light, or may be an audible signal in the form of a beeping sound. If the device 10 is connected to the remote computer 272 via the network 224, the signal may be sent to the remote computer 272, and the remote computer 272 may provide an alert to the user. The alert may be in the form of an electronic mail message that is sent by the remote computer 272 to the user's e-mail account. If the signal is only sent to the user's local computer 226, the alert may simple be in the form of a pop-up window on the computer's screen. The aforementioned alerts are not intended to be limiting in any way f. Camera As shown in FIG. 20, in an embodiment, the device 10 includes a monitoring chamber 240 that includes an imaging device 242 that may be in communication with the controller 70. The monitoring chamber 240 is communicated between the insect inlet 26 and the insect trap chamber that is defined by the bag 40. The imaging device 242 is configured to capture images of flying insects that have entered the insect inlet 26, and output a signal to the controller 70. The signal may include the images themselves, and/or may include other information related to the images being captured, such as the number of insects that have passed by the imaging device 242 (e.g., the imaging device 242 may also be used as an insect counter). A display of the images being captured by the imaging device 242 may be provided to the screen of the local computer 226 and also may be stored on the local computer 226 and/or the remote computer 272. The imaging device 242 would allow the user to monitor what species of insects are entering the device 10, so that the user may verify that the correct attractant is being used without having to inspect the bag 40.

The monitoring chamber 240 defines a reduced velocity zone 244 to enable flow of air between the insect inlet 26 and the insect trap chamber to be reduced. The may slow the insects that have entered the insect inlet down to a speed at which a clear image may be captured by the imaging device 242. An increased velocity zone 246 may also be provided between the monitoring chamber 240 and the insect trap chamber to enable flow of air between the monitoring chamber 240 and the insect chamber to be increased. The imaging device may include a camera, and the camera may be configured to provide still images. The camera may also be a video camera that provides a continuous stream of images.

The ability to be able to actually see what insects are being caught as they are being caught may provide useful information. For example, for devices that are networked to the remote computer 272 and include at least some of the sensors 214, 216, 218, 220 that monitor the performance of the combustion device, data on optimum conditions for trapping specific species may be collected and complied.

In addition, a real-time determination may be made as to whether the correct attractant is being used. For example, if the insect attractant in the insect attractant element 160 is more suitable for sandflies, yet only mosquitoes are entering the device, the user may realize that the insect attractant should probably be changed to increase the number of mosquitoes being trapped.

g. Attractant Sensor

Figure 21:
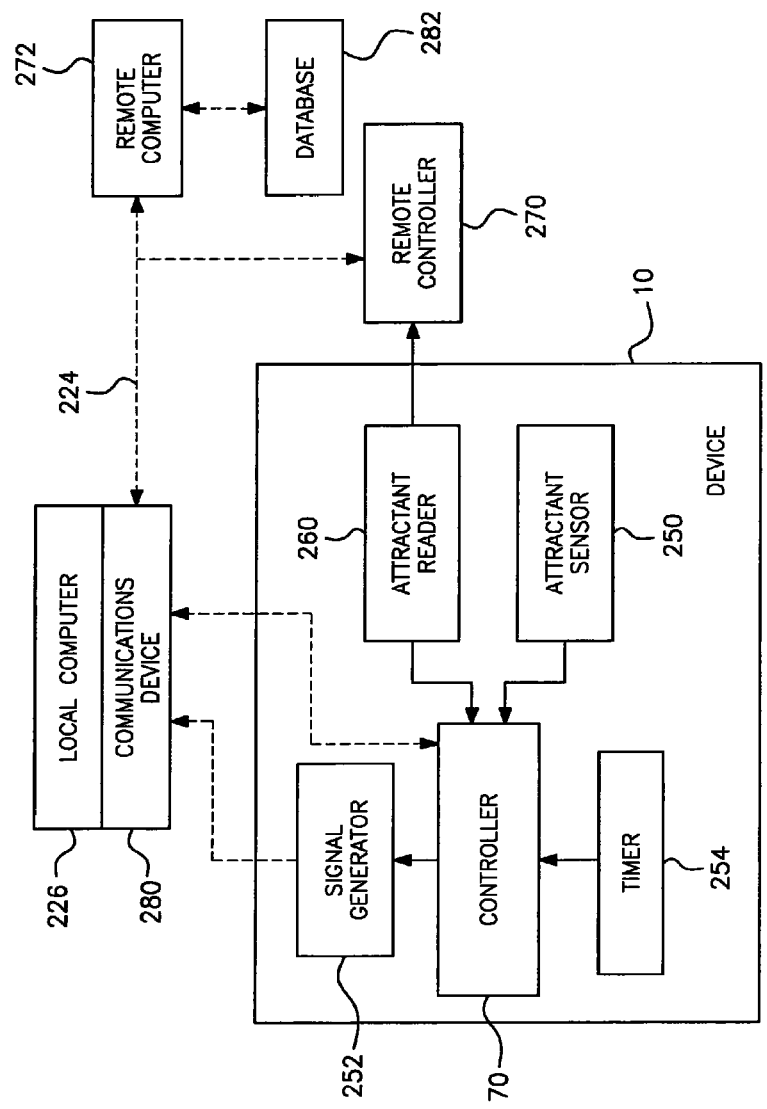
FIG. 21 is a schematic of additional components of the device of FIG. 2.

In an embodiment, the device 10 includes a sensor 250, shown in FIG. 21, for sensing an amount of attractant in the device 10. The sensor 250 may be a sensor that is configured to sense the weight of the attractant in the device, or the sensor 250 may be a chemical sensor that is configured to sense at least one property of the attractant, such as pH. A signal generator 252 may be in communication with the controller 70 and configured to generate a signal to alert the user of the device when the weight of the attractant is sensed to be below a predetermined threshold. The signal may be an audible signal and/or a visual signal on the device 10 itself, or may be communicated to the local computer 226. Any type of sensor may be used to provide an indication that the attractant should be replaced, and any type signal may be used to alert the user that the attractant should be replaced. The described embodiment is not intended to be limiting in any way.

h. Attractant Timer

In an embodiment, the device 10 may include a timer 254, shown in FIG. 21, that is configured to monitor an amount of time the attractant has been mounted to the device 10. The timer 254 may also be configured to provide a signal via the controller 70 and signal generator 252 when a predetermined amount of time has passed. The predetermined amount of time may be programmed into the timer 254 and may be based on the known or estimated diffusion rate of the attractant into the exhaust gas at a particular flow rate.

The timer 254 may be further configured to adjust the predetermined amount of time based on an operating parameter of the device 10, such as the fan speed of the fan 54 that provides the flow of the make-up air to the combustion device, or the flow of the fuel being provided to the combustion device via the fuel regulator 110. For example, in embodiments of the device 10 that include the photosensor 210 and allow for the flow of the air provided to the combustion device to be reduced during the day, the exhaust flow will also be reduced during the day, which will increase the amount of time it will take for all of the attractant to diffuse into the exhaust flow. By configuring the timer 254 to adjust the predetermined amount of time, false signals that indicate that the attractant has been depleted may be reduced or even avoided. The above described embodiment of the attractant timer is not intended to be limiting in any way.

I. Attractant Reader

In an embodiment, the attractant includes a machine readable identifier 258, shown in FIG. 16, and the device 10 may include an attractant reader 260, shown in FIG. 21, that is configured to read the machine readable identifier 258 when the attractant is placed in the device 10. The machine readable identifier 258 may include a bar code and/or a radio frequency identification tag.

The reader 260 may also be configured to communicate a signal that indicates that the attractant is in the device 10 to a controller that is associated with the device 10. The controller may be the controller 70 described above that is supported by the frame 14, or the controller may be a controller 270 that is located away from the device 10. The reader 260 may be in communication with the timer 254 such that when the reader 260 detects that the attractant has been placed in the device 10, the timer 254 starts to keep track of the amount of time that the attractant has been mounted to the device 10. The controller 70, 270, may be configured to communicate with the network 224 and provide the signal to the local computer 226, and/or the remote computer 272 when the timer 254 has determined that the attractant should be replaced. The attractant reader 260 may be any type of reading device that may communicate whether an attractant has been placed in the device 10. The above described embodiments are not intended to be limiting in any way.

Database and Collection

The device 10 may also include a communications device 280 that is configured to communicate with the controller 70, 270 and with an external database 282. For example, the communications device 280 may be a communications card that is physically connected with a cable to the local computer 226, or may be any other type of device that has the capability of updating a database. Preferably, the communications device 280 is a wireless device that may communicate with controller 70, 270 and the local computer 226 and then ultimately to the remote computer 272 and central database 282 via the wide area network 224. For individual uses, such as a private yard with a single device 10, the user may be able to monitor the device 10 from inside the home, and also provide the central database 282 with streaming data from all of the sensors on the device 10. This way, even if the user is not monitoring the device 10, a more central monitor may be used, much like the personal security systems that are used to monitor the status of various alarms in homes. This way, if the central monitor identifies an action that needs to be taken by the user, such as replenishing the fuel supply and/or attractant, the central monitor can contact the user either via phone or electronic mail to alert the user that the action should be taken.

Returning to FIG. 1, for applications in which a plurality of devices 10 are used to create a barrier, the system 1 of such devices may be used. The system 1 may also include the local computer 226 that is networked with the devices 10 such that the computer 226 collects the data being collected by the sensors 210, 212, 214, 216, 218, 220, 222, 230 and the controller 70 of each device 10. The computer 226 may provide local monitoring and support by compiling the data and notifying a user of the system 1 when one or more of the devices 10 needs attention. In addition, remote monitoring and support may be provided in embodiments where the local network 2 is in communication with the remote computer 272, either directly or through the local computer 226, via the wide area network 224. By being provided with the monitoring function, the user of the system 1 may be notified that the attractant has been depleted and needs to be changed, or that the device should be moved to another location because even though the device is operating properly, the device is not collecting insects. The notice to the user may be in the form of an electronic message, or may in the form a visual or audible signal, as discussed above.

The remote computer 272 may be in communication with devices that are located all over the world and may compile data from all over the world. This way, the central database 282 may be compiled and analyzed for world wide trends, such as species migration. In addition, the data collected may be used for optimization of operating conditions that are specific to a certain species.

In addition, if more than one device is located within a particular geographical region, a comparison can be made between such devices, and notifications to users of underperforming devices may be generated. Geographical regions may be defined by zip or postal codes, telephone area codes, states, counties, cities, towns, boroughs, etc., or even by ranges of longitude and latitude coordinates. These examples of how a geographical region may be defined are not intended to be limiting in any way.

For example, for small predefined areas in which a system 1 of devices 10 is installed, such as resort areas, the predefined area may be treated as its own geographical region. By being able to monitor and control the individual devices 10 within a system 1, a more effective insect barrier may be provided to the predefined area. For example, because portions of the predefined area may have unique attributes, e.g., one portion of the area may be swamp-like, thereby attracting mosquitoes, while another portion may have a beach, thereby attracting sandflies, by configuring the system 1 to individually control each device 10 for the type of flying insects being attracted to that particular device, an improved barrier to multiple flying insects may be created.

Figure 22:
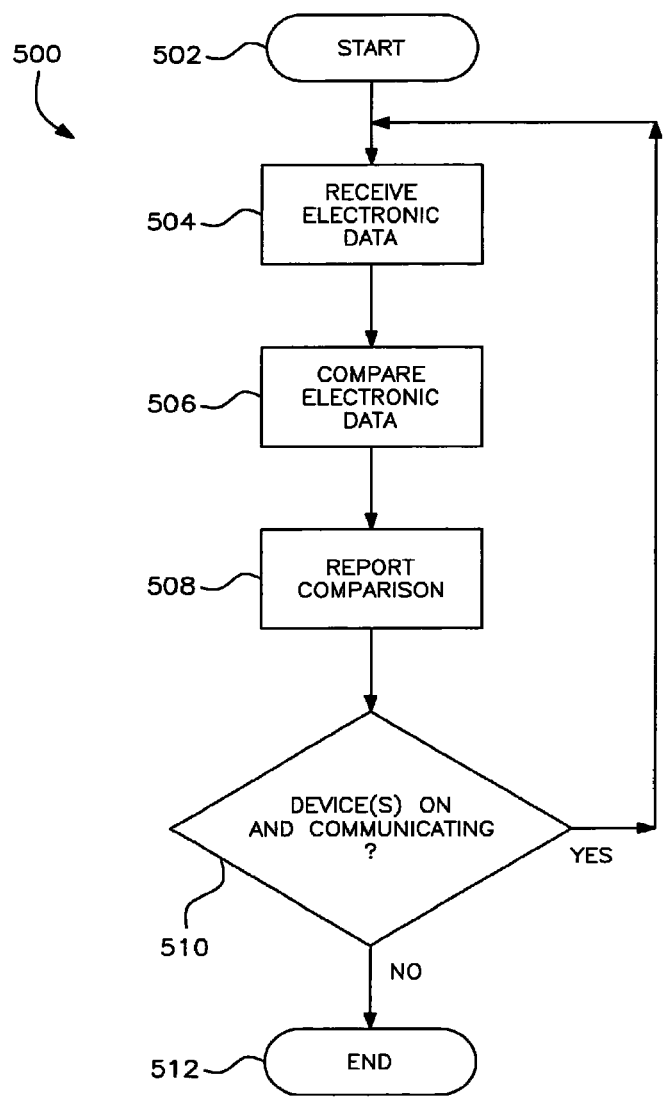
FIG. 22 is a flow chart of a method according to an embodiment of the invention.

FIG. 22 illustrates an embodiment of a method 500 for evaluating performance of a plurality of insect trapping devices 10. The method starts at 502. At 504, electronic data is received from each of the insect trapping devices. The data is representative of an accumulation of insects in the device 10. At 506, the electronic data from the insect trapping devices is compared to determine relative accumulation of insects in the trapping devices. The results of the comparison are reported at 508. At 510, as long as the devices are turned on and are able to communicate, the method goes back to 504. Otherwise, the method ends at 512.

The comparison of the electronic data may include identifying one or more of the devices that is accumulating less insects than one or more of the other devices, and reporting the comparison may include reporting the one or more devices that are accumulating less insects. By reporting that one or more of the devices are accumulating less insects that the others, an investigation may be undertaken so that corrective action may be taken to improve the performance of the devices that are accumulating less insects than the others.

The electronic data received may also include electronic data that relates to at least one parameter associated with each trap, and the reporting may include reporting the parameter of the one or more traps accumulating less insects. The parameter may be the type of attractant used by the device, the amount of time the attractant has been in the device, the temperature of the outflow of the device, the amount of carbon monoxide being generated by the device, the amount of carbon dioxide being generated by the device, the amount of oxygen in the outflow of the device, a difference between the temperature outflow and temperature of ambient air surrounding the device, the flow rate of fuel being supplied to the device, the flow rate of the air being supplied to the combustion device, etc. By correlating the accumulation data of individual devices with the aforementioned parameters, changes may be made in an attempt to increase the accumulation of insects.

The comparison may also include comparing the electronic data and comparing the parameter to identify any correlation between the parameter of the one or more insect traps accumulating less insects. Optionally, the method may also include providing a warning signal to indicate that the parameter should be adjusted. The method may also include adjusting the parameter of the one or more traps that are accumulating less insects. The electronic data may also include the geographic locations of the devices, and at least one weather condition at the geographic locations of the devices. For example, if a comparison of the data shows that one device is accumulating less insects than another device that is similarly situated in the same geographical region, and the data also shows that the level of carbon monoxide in the exhaust gas of the device that is accumulating less insects is higher than that of the other device, the air to fuel ratio that is being provided to the combustion device of the suspect device (i.e., the device that is not accumulating as many insects as the others) may be too low. As such, corrective action may be taken to increase the air to fuel ratio, as discussed above. Of course other parameters may be correlated with the performance of the device and the appropriate corrective action may be taken to improve the performance, as discussed above with the various sensors. The example provided is not intended to be limiting in any way.

By providing the infrastructure in the form of instrumented devices, as described above, and a central database in communication with such devices, the possibilities for studying and improving the efficiency and placement of the devices to optimize the capturing of flying insects are limitless. Over time, the collection and comparison of such data may lead to the discovery of significant trends, which may be used to improve the performance of devices year-round.

For example, the data may show that a particular attractant is effective during certain times of the year, while ineffective at other times of the year. Specifically, over time, it may be found that the use of octenol to attract and capture a certain species of mosquitoes is particularly effective in May and June, but in that same region, octenol is not particularly effective in July and August. This may be due to the fact that the species being capture May and June is not longer the dominant species in July and August. However, the collected data may also show that LUREX™ is effective to attract and capture another species in July and August. This would allow alerts to be sent to the users of the devices within the geographical region in late June/early July that the attractant should be switched from octenol to LUREX™. For the devices that include the attractant dispenser that is discussed above, a signal may be sent to the controller to power the motor and rotate the attractant holder so that the attractant may be changed. Of course, this is but one example of how the data may be used to improve the performance of devices on a larger scale, and is not intended to be limiting in any way.

The foregoing illustrated embodiment has been provided to illustrate the functional and structural principles of the present invention and is not intended to be limiting. To the contrary, the present invention is intended to encompass all alterations, additions, substitutions and equivalents within the spirit and scope of the following appended claims.

What is claimed is:

1. A flying insect trapping device configured to be used with a fuel supply containing combustible fuel, comprising:
   a supporting frame;
   an insect trap chamber;
   a combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas comprising carbon dioxide within said combustion chamber;
   a fuel regulator for controlling fuel flow to the inlet port of the combustion device;
   a fan for controlling air flow to the combustion device;
   an exhaust outlet communicated with the exhaust port of said combustion device and being configured to allow said exhaust gas to flow outwardly through said exhaust outlet so that insects attracted to the carbon dioxide in said exhaust gas will fly towards said device;
   an insect inlet communicated with said insect trap chamber to enable flying insects to enter said trap chamber through said insect inlet; and
   a photosensor on an exterior of the device for detecting ambient light; and
   an optical sensor constructed and arranged to provide a beam of light through the insect trap chamber and measure an amount of light that passes through the insect trap chamber to monitor and determine an accumulation of the insects in the insect trap chamber.

2. The device according to claim 1, wherein the photosensor detects a level of the ambient light, said device using said ambient light level to determine when to shut down.

3. The flying insect trapping device as set forth in claim 1, further comprising a controller at the device and a remote computer, said controller receiving a signal from the optical sensor when an amount of light passing through the insect chamber is below a threshold, and said controller communicating information received from the optical sensor to the remote computer.

4. A flying insect trapping device configured to be used with a fuel supply containing combustible fuel, comprising:
a supporting frame;
an insect trap chamber;
a combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas within said combustion chamber;
a fan for controlling air flow to the combustion device;
an exhaust outlet communicated with the exhaust port of said combustion device and being configured to allow said exhaust gas to flow outwardly through said exhaust outlet so that insects attracted to the carbon dioxide in said exhaust gas will fly towards said device;
an insect inlet communicated with said insect trap chamber to enable flying insects to enter said trap chamber through said insect inlet;
an optical sensor constructed and arranged to provide a beam of light through the insect trap chamber and measure an amount of light that passes through the insect trap chamber to monitor and determine an accumulation of the insects in the insect trap chamber;
a first temperature sensor a temperature of ambient air surrounding the device; and
a second temperature sensor sensing a temperature of the exhaust gas.

5. The device according to claim 4, further comprising a heat exchanger device located adjacent said combustion chamber and downstream of an air flow from said fan, said fan forcing air through openings in said heat exchanger device to cool said heat exchanger device.

6. The device according to claim 5, wherein the exhaust gas flows from the exhaust port of the combustion device to the exhaust outlet along a path,
the path having an inlet opening into the heat exchanger device and the fan being arranged to deliver air into the inlet opening for mixing with the exhaust gas from the combustion chamber;
said fan drawing air from the insect inlet and causing said air to flow through the inlet opening and through said openings in the heat exchanger device to cool said heat exchanger device and absorb heat transferred from said exhaust gas.

7. The device according to claim 6, further comprising a vacuum device communicated to said insect inlet, said vacuum device being constructed and arranged to draw insects attracted to said exhaust outlet through said insect inlet and into said insect trap chamber.

8. The device according to claim 4, further including a third temperature sensor that senses the temperature of the ambient air.

9. The device according to claim 4, further including fourth temperature sensor that senses the temperature of the exhaust gas.

10. The device according to claim 4, further including a carbon dioxide sensor sensing an amount of carbon dioxide in the exhaust gas.

11. The device according to claim 4, further including a carbon monoxide sensor sensing an amount of carbon monoxide in the exhaust gas.

12. The device according to claim 4, further including an oxygen sensor sensing the amount of oxygen in the exhaust gas.

13. The flying insect trapping device as set forth in claim 4, further comprising a controller at the device and a remote computer, said controller receiving a signal from the optical sensor when an amount of light passing through the insect chamber is below a threshold, and said controller communicating information received from the optical sensor to the remote computer.

14. The flying insect trapping device as set forth in claim 4, further comprising a removable attractant mounted to the device and a timer that monitors an amount of time the attractant has been mounted to the device.

15. A flying insect trapping device comprising:
a supporting frame;
an insect trap chamber;
an insect attractant for attracting insects towards said device;
an insect inlet communicated with said insect trap chamber to enable flying insects to enter said trap chamber through said insect inlet;
a vacuum device communicated to said insect inlet, said vacuum device being constructed and arranged to draw insects attracted to the insect attractant through said insect inlet and into said insect trap chamber; and
an optical sensor constructed and arranged to provide a beam of light through the insect trap chamber and measure an amount of light that passes through the insect trap chamber to monitor and determine an accumulation of the insects in the insect trap chamber.

16. The flying insect trapping device as set forth in claim 15, further comprising a controller at the device and a remote computer, said controller receiving a signal from the optical sensor when an amount of light passing through the insect chamber is below a threshold, and said controller communicating information received from the optical sensor to the remote computer.

17. The flying insect trapping device as set forth in claim 15, further comprising a timer that monitors an amount of time the attractant has been mounted to the device.

18. A flying insect trapping device comprising:
a supporting frame;
an insect trap chamber;
an insect attractant for attracting insects towards said device;
an insect inlet communicated with said insect trap chamber to enable flying insects to enter said trap chamber through said insect inlet;
a vacuum device communicated to said insect inlet, said vacuum device being constructed and arranged to draw insects attracted to said device through said insect inlet and into said insect trap chamber; and
a monitoring chamber including an imaging device, said monitoring chamber communicated between said insect inlet and said insect trap chamber, said imaging device capturing images of flying insects that have entered said insect inlet; and an optical sensor constructed and arranged to provide a beam of light through the insect trap chamber and measure an amount of light that passes through the insect trap chamber to monitor and determine an accumulation of the insects in the insect trap chamber.

19. The flying insect trapping device as set forth in claim 18, further comprising a controller at the device and a remote computer, said controller receiving a signal from the optical sensor when an amount of light passing through the insect chamber is below a threshold, and said controller communicating information received from the optical sensor to the remote computer.

20. The flying insect trapping device as set forth in claim 18, further comprising a timer that monitors an amount of time the attractant has been mounted to the device.

21. A flying insect trapping device comprising:
a supporting frame;
an insect trap chamber;
an insect attractant for attracting insects towards said device;
an insect inlet communicated with said insect trap chamber to enable flying insects to enter said trap chamber through said insect inlet;
a vacuum device communicated to said insect inlet, said vacuum device being constructed and arranged to draw insects attracted to the insect attractant through said insect inlet and into said insect trap chamber;
an optical sensor constructed and arranged to provide a beam of light through the insect trap chamber and measure an amount of light that passes through the insect trap chamber to monitor and determine an accumulation of the insects in the insect trap chamber; and
a controller that adjusts at least one operating parameter of the device based on at least one weather condition at the device, the weather condition being selected from the group consisting of wind direction, wind speed, relative humidity and rainfall.

22. The flying insect trapping device as set forth in claim 21, further comprising a controller at the device and a remote computer, said controller receiving a signal from the optical sensor when an amount of light passing through the insect chamber is below a threshold, and said controller communicating information received from the optical sensor to the remote computer.

23. The flying insect trapping device as set forth in claim 21, further comprising a timer that monitors an amount of time the attractant has been mounted to the device.

* * * * *